Figure 1:
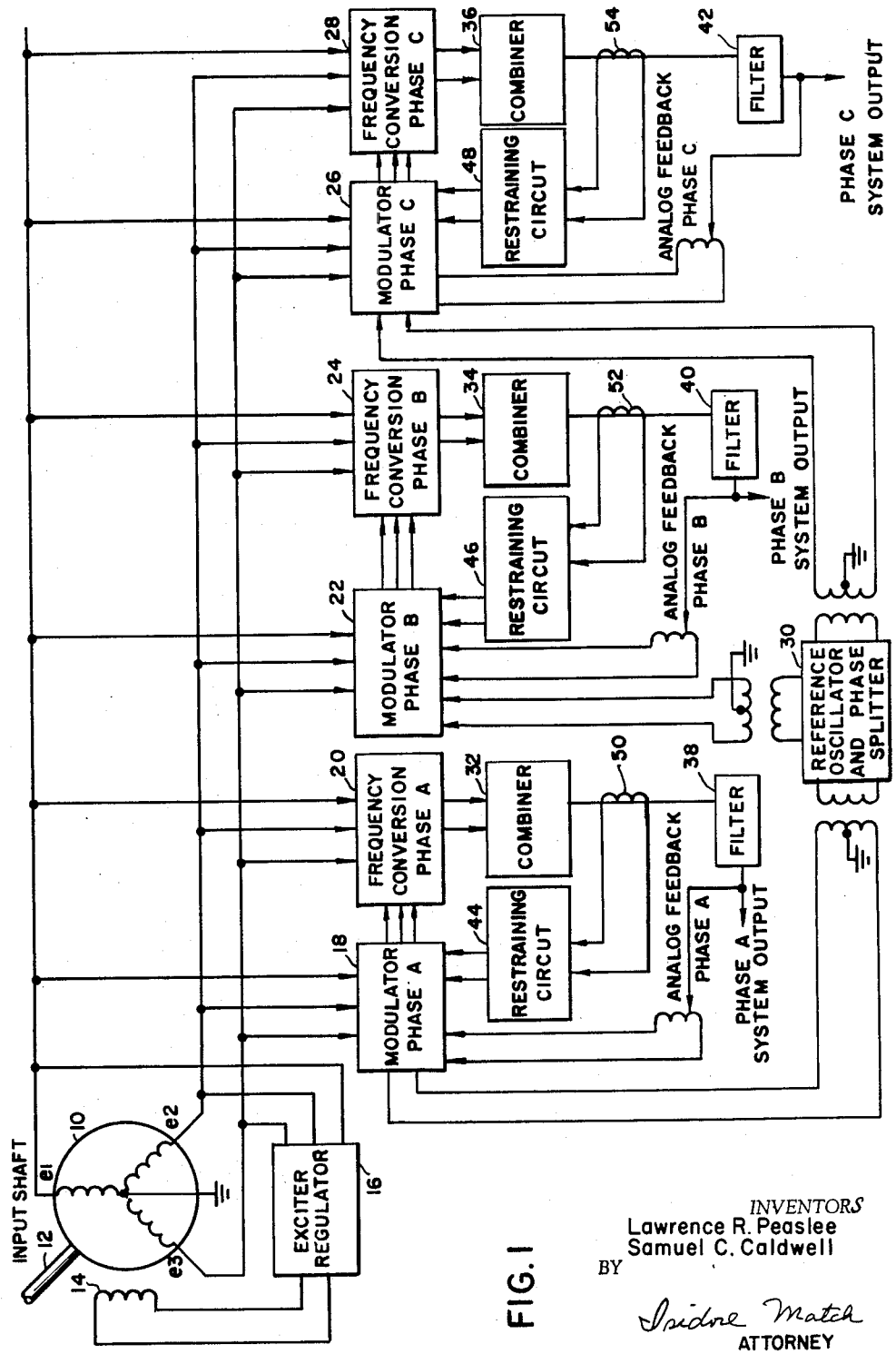
Figure 13:
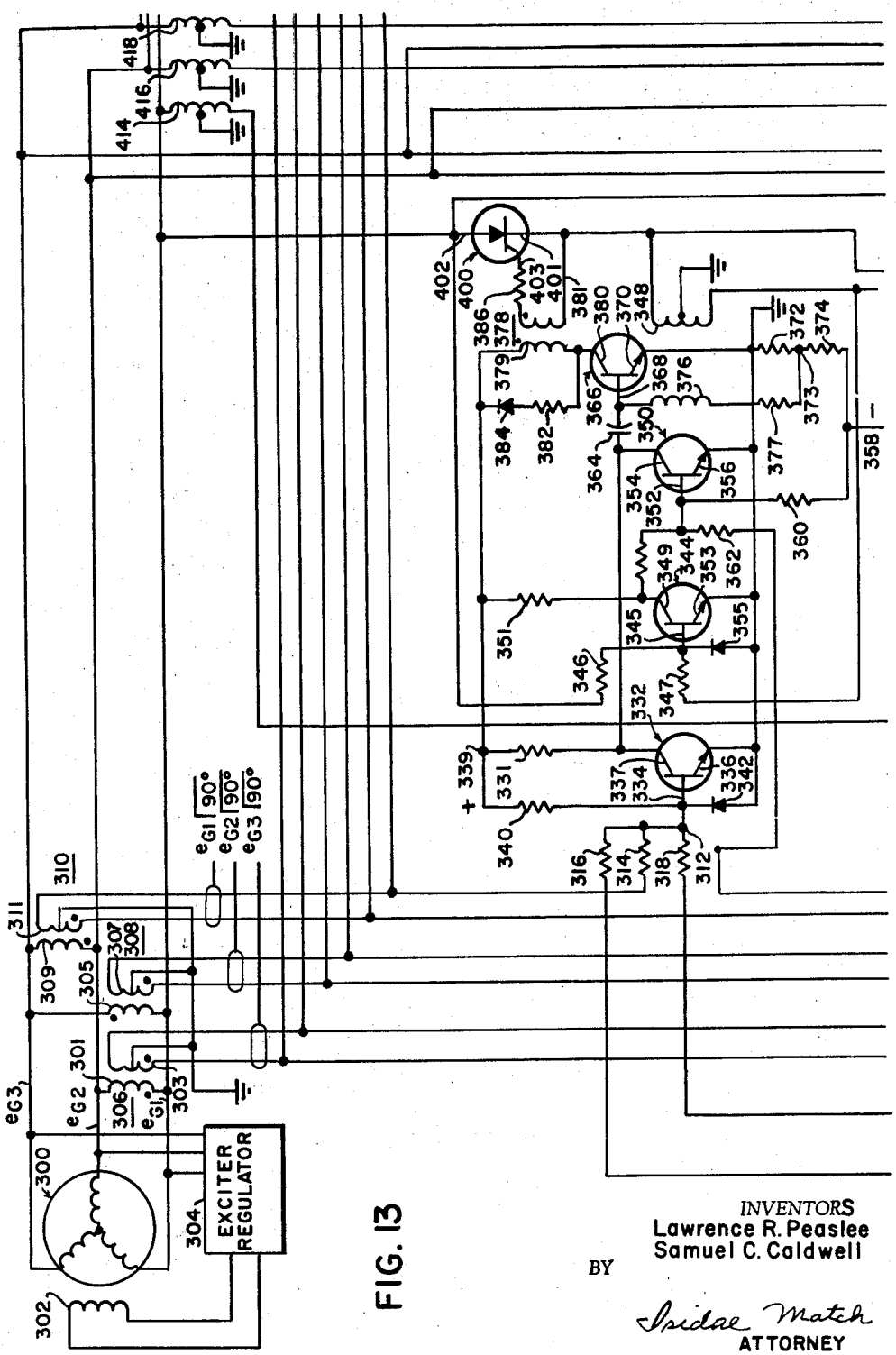
Figure 14:
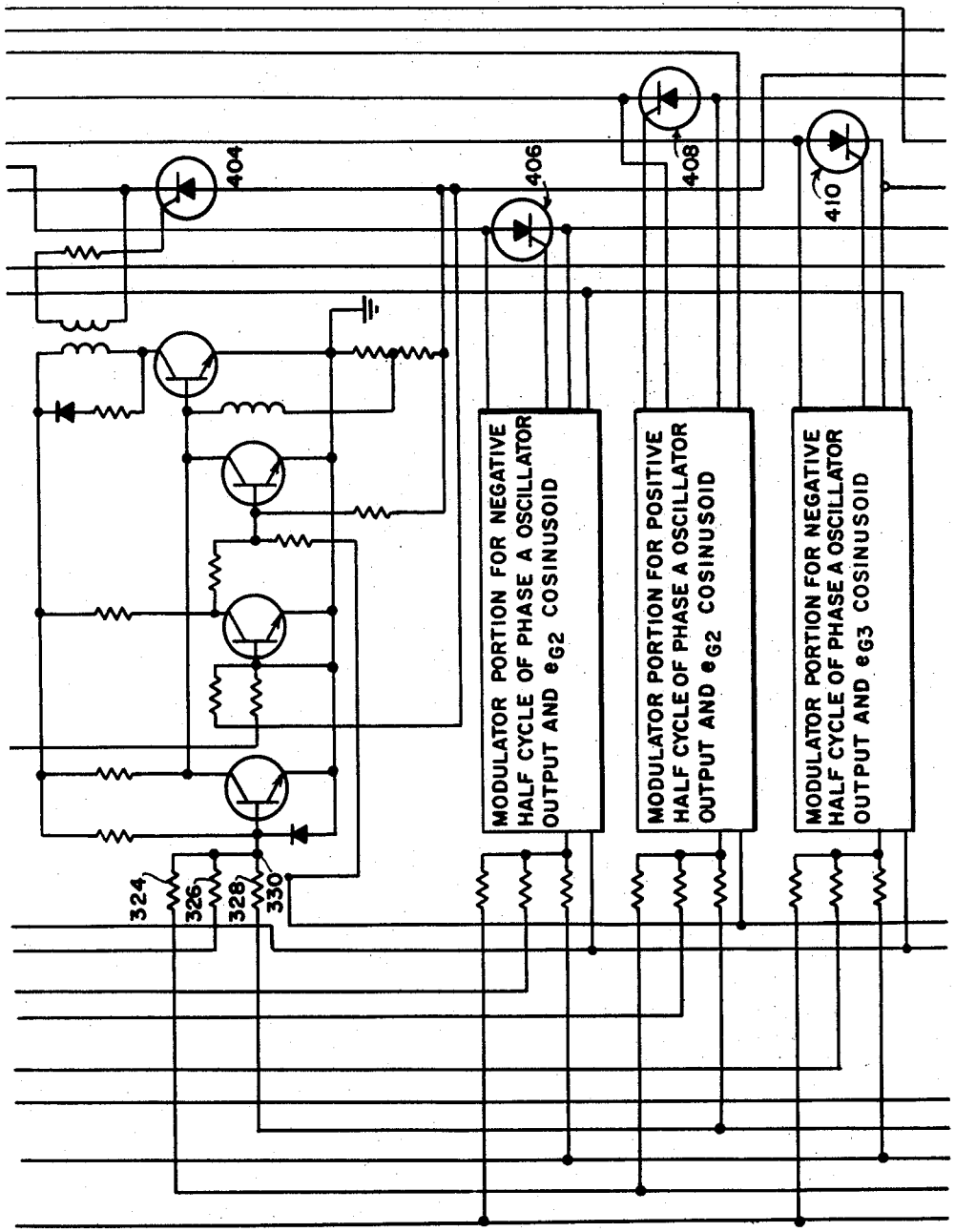
Figure 15:
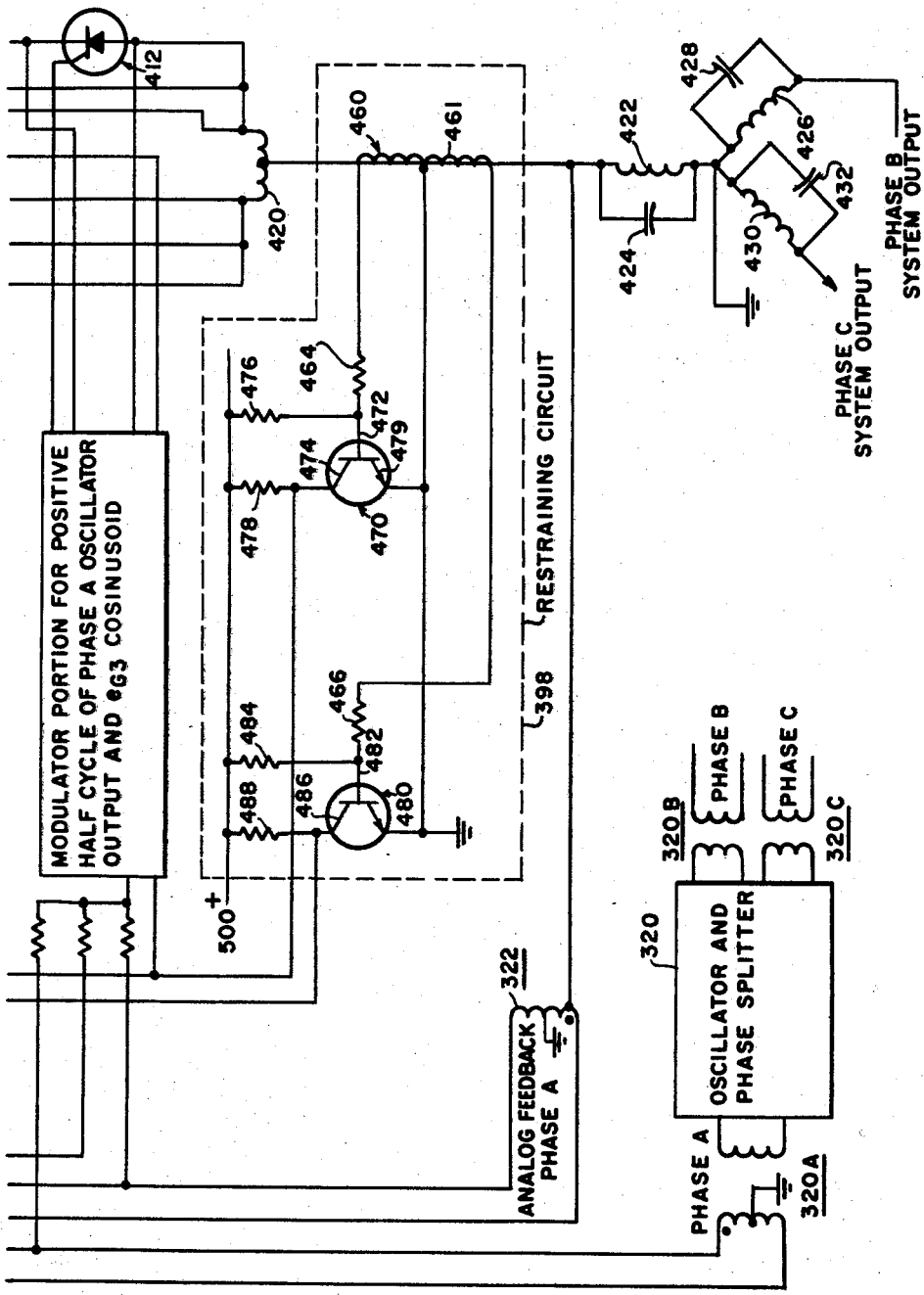

Sept. 8, 1964  L. R. PEASLEE ETAL  3,148,324
SYSTEM FOR PROVIDING A RANGE OF DETERMINATE
FREQUENCIES FROM A VARIABLE SPEED SOURCE
Filed Aug. 8, 1961  12 Sheets-Sheet 2
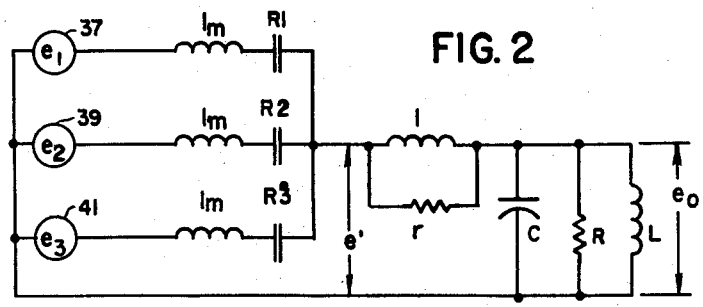
FIG. 2
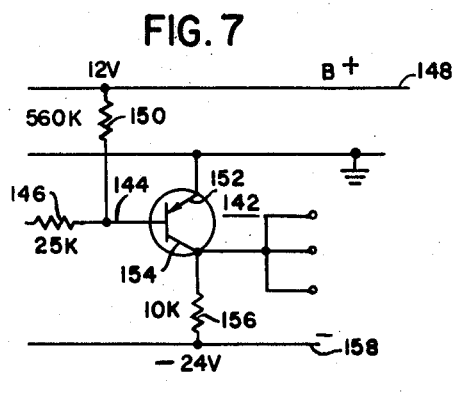
FIG. 7
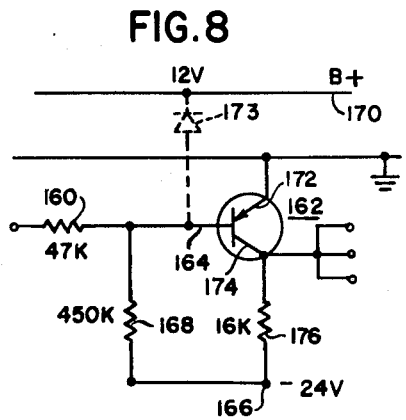
FIG. 8
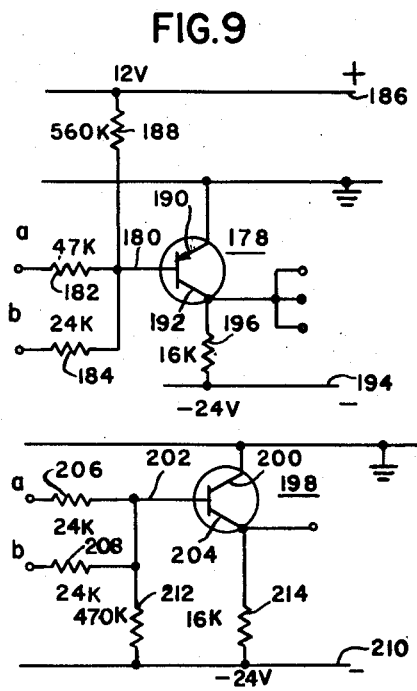
FIG. 9
FIG. 10
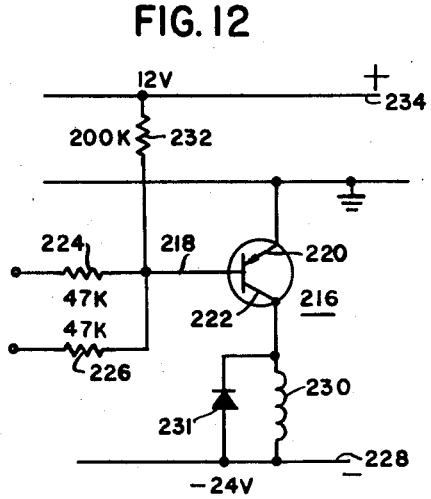
FIG. 12
INVENTORS
Lawrence R. Peaslee
Samuel C. Caldwell
BY  *Isidore Match*
ATTORNEY

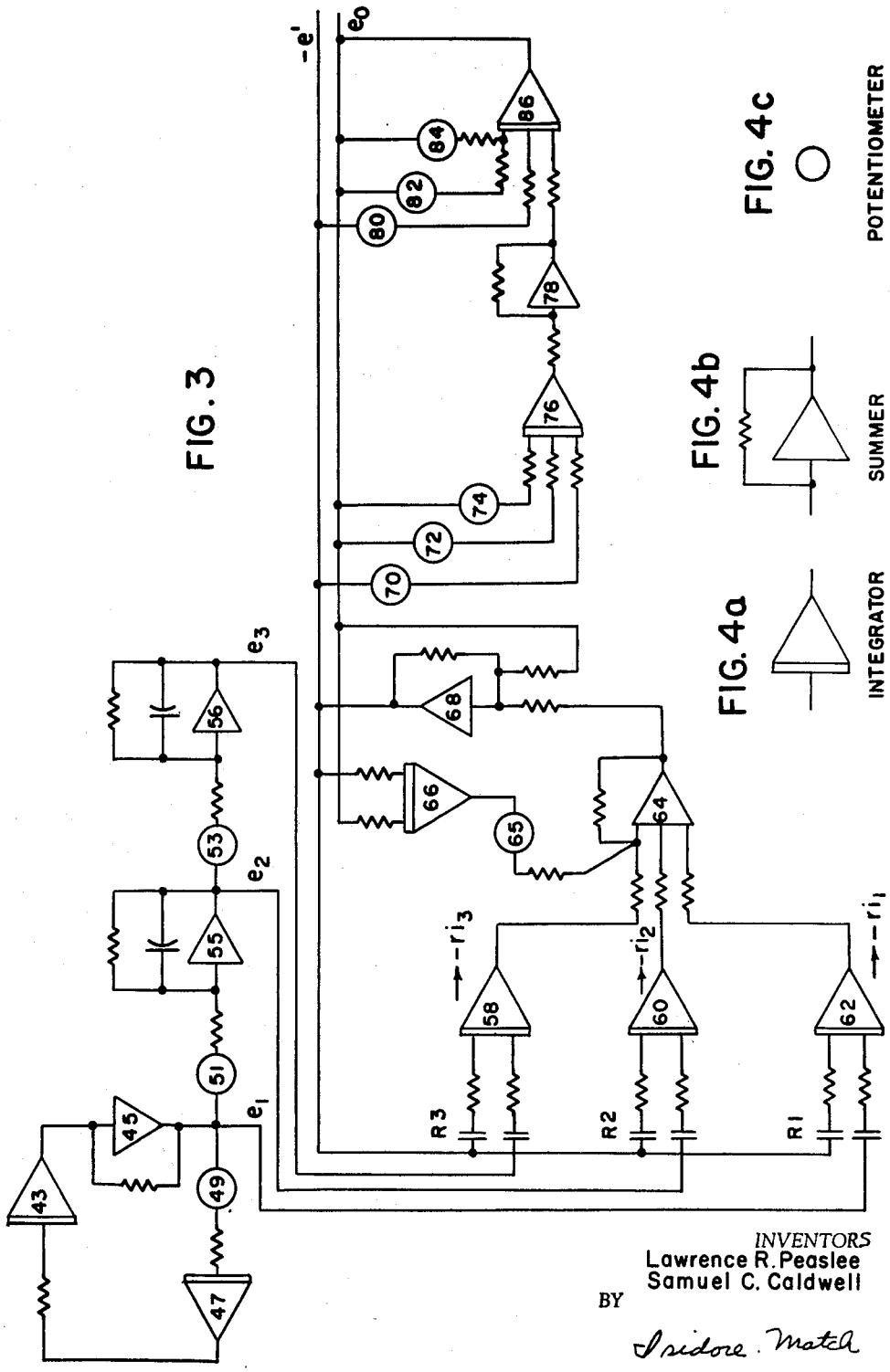

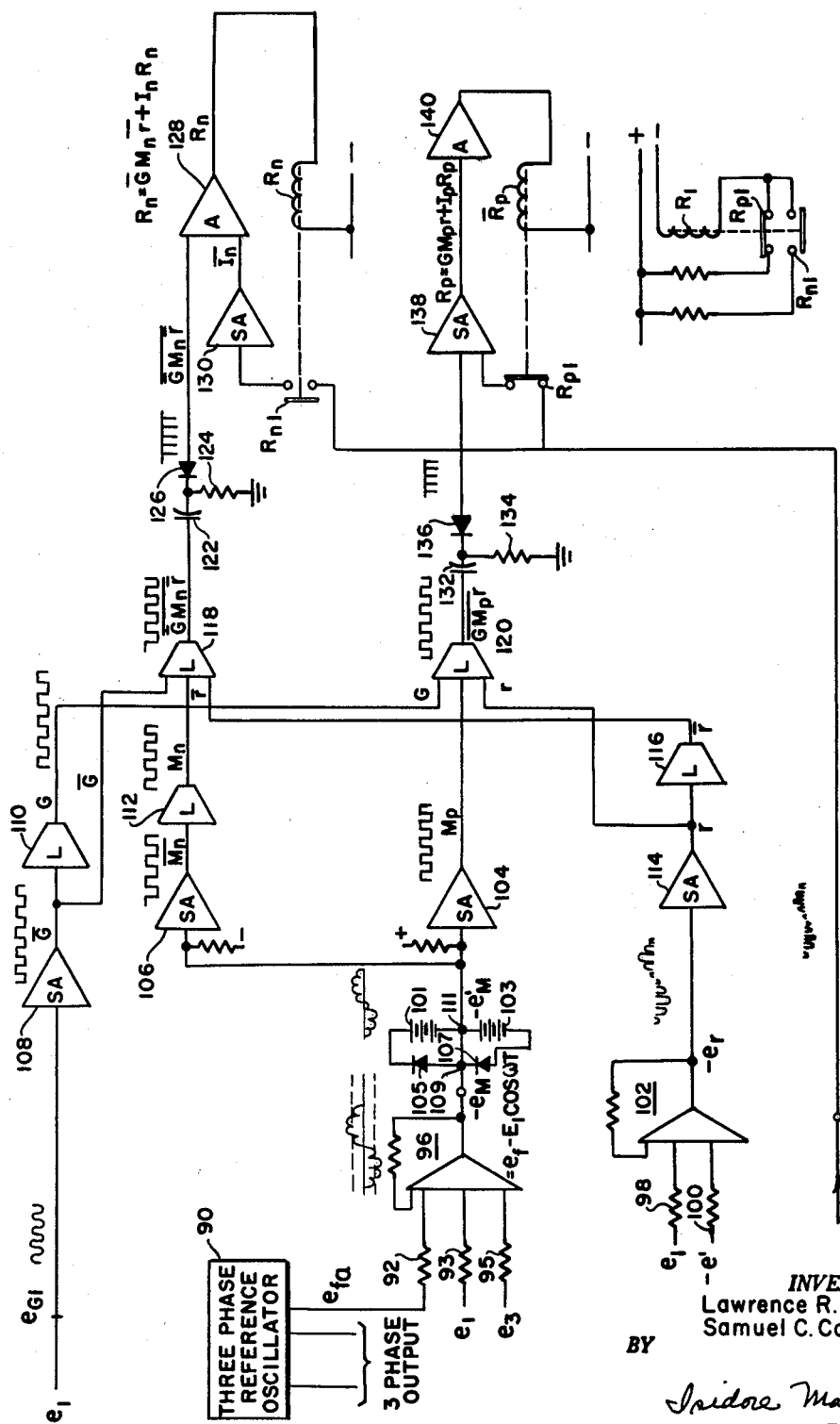

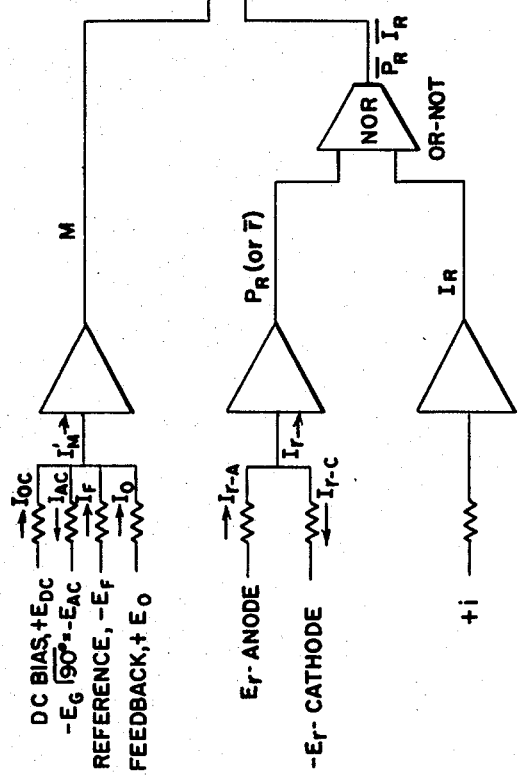
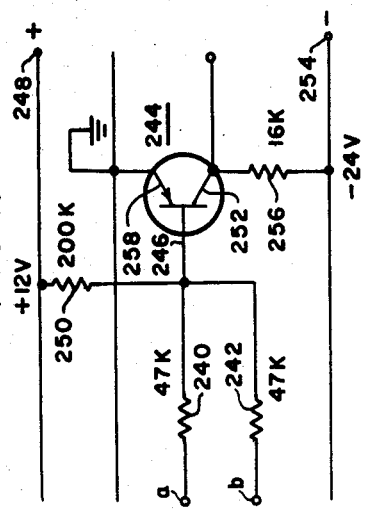

INVENTORS
Lawrence R. Peaslee
Samuel C. Caldwell
BY
ATTORNEY

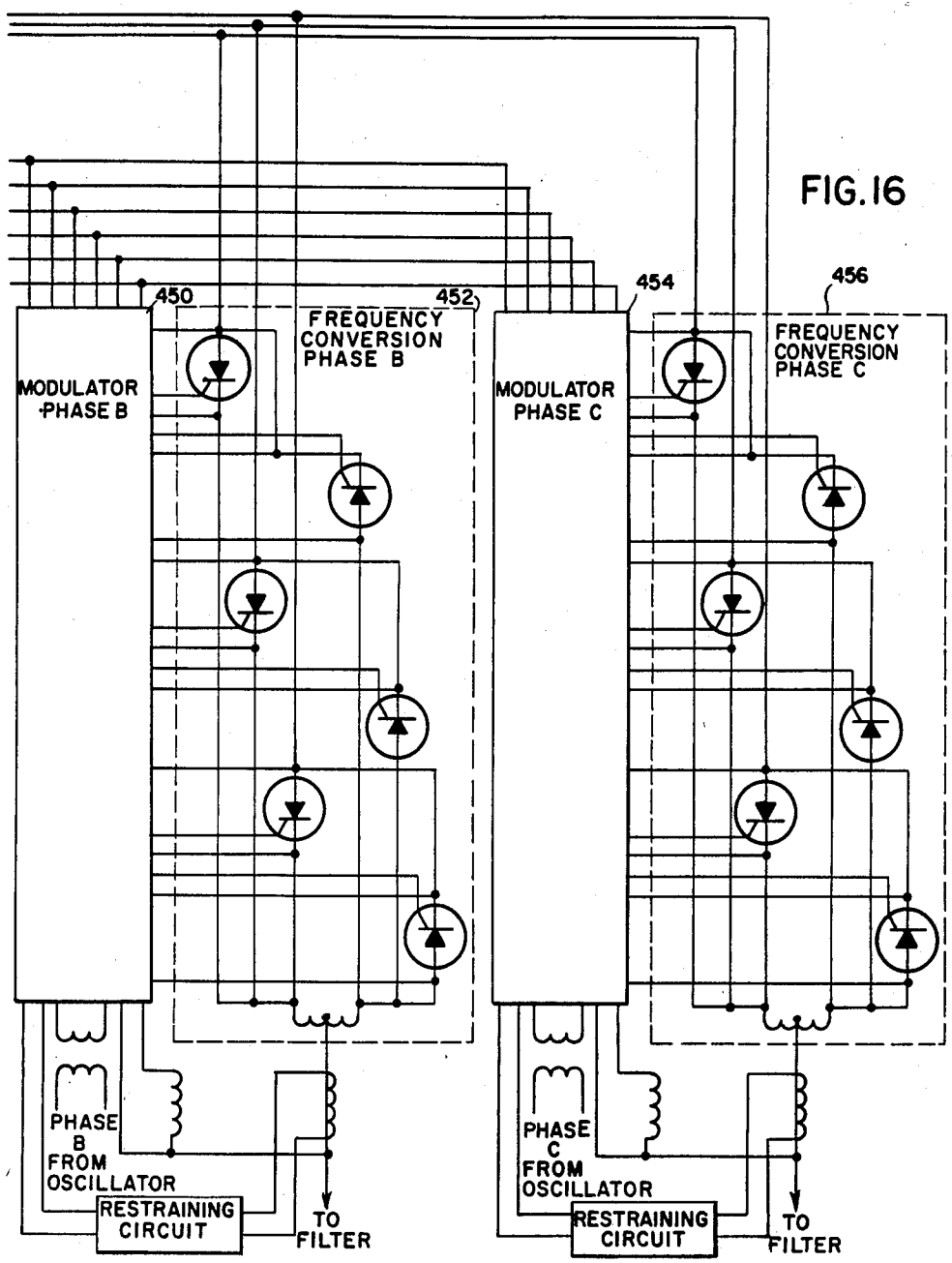

Sept. 8, 1964    L. R. PEASLEE ETAL    3,148,324
SYSTEM FOR PROVIDING A RANGE OF DETERMINATE
FREQUENCIES FROM A VARIABLE SPEED SOURCE
Filed Aug. 8, 1961                          12 Sheets-Sheet 10
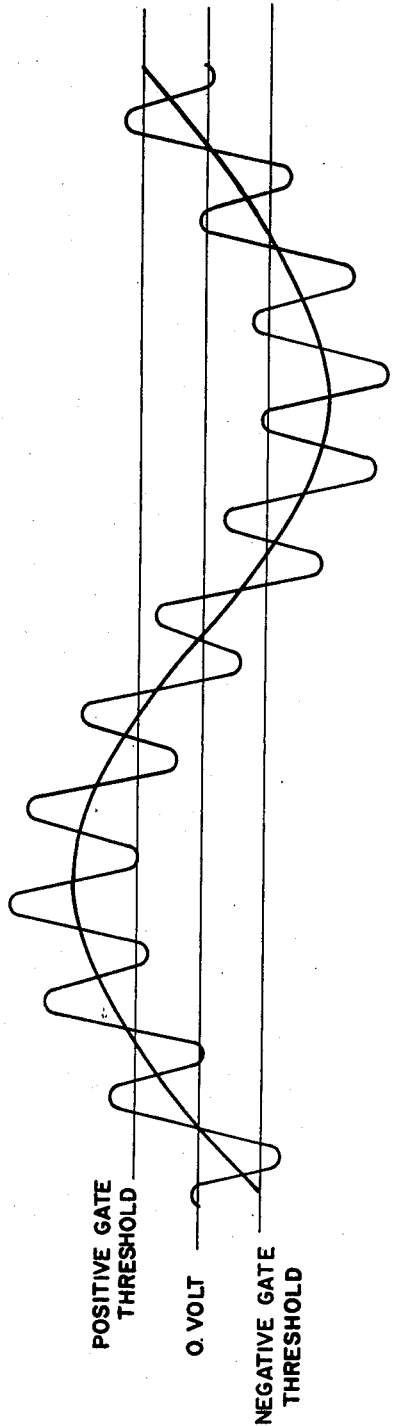
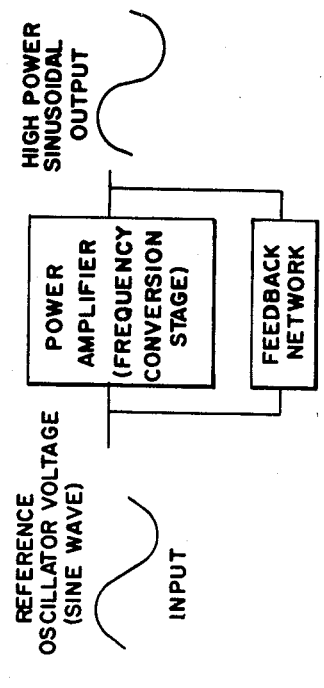
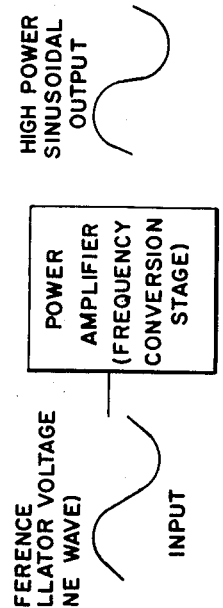
INVENTORS
Lawrence R. Peaslee
Samuel C. Caldwell
BY
*Isidore Match*
ATTORNEY

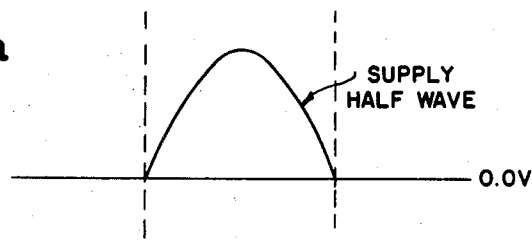
FIG. 19a — SUPPLY HALF WAVE — 0.0V
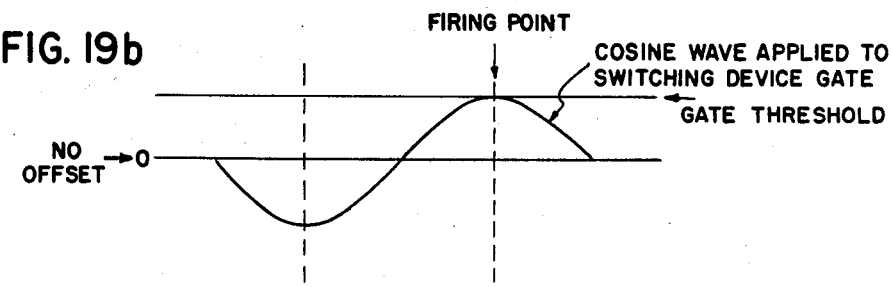
FIG. 19b — FIRING POINT — COSINE WAVE APPLIED TO SWITCHING DEVICE GATE — GATE THRESHOLD — NO OFFSET
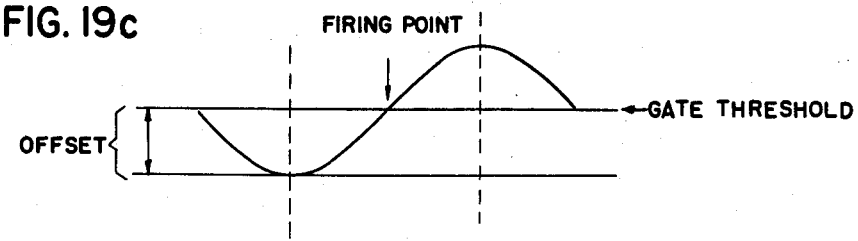
FIG. 19c — FIRING POINT — GATE THRESHOLD — OFFSET
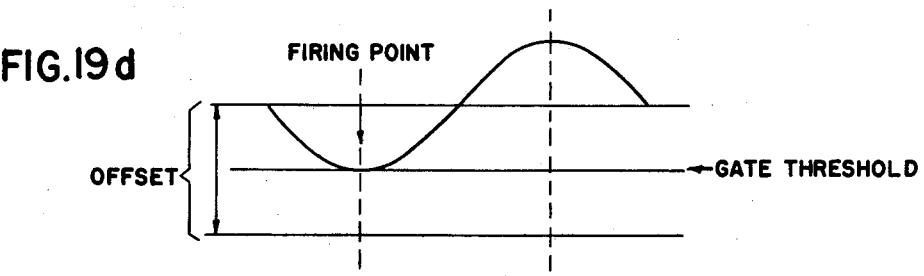
FIG. 19d — FIRING POINT — GATE THRESHOLD — OFFSET
INVENTORS
Lawrence R. Peaslee
Samuel C. Caldwell
BY
Isidore Match
ATTORNEY

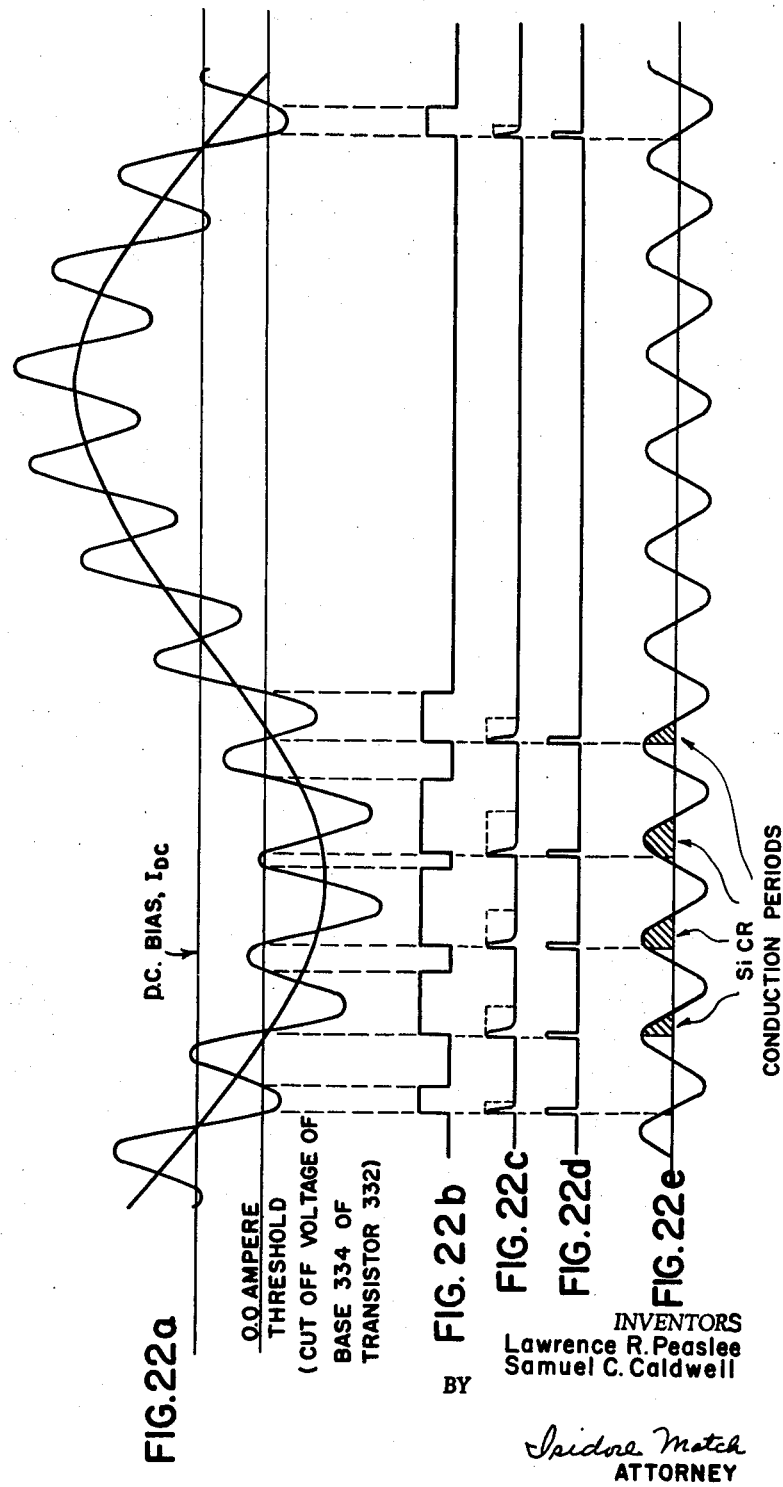

United States Patent Office 3,148,324
Patented Sept. 8, 1964

3,148,324
SYSTEM FOR PROVIDING A RANGE OF DETERMINATE FREQUENCIES FROM A VARIABLE SPEED SOURCE
Lawrence R. Peaslee, Waynesboro, Va., and Samuel C. Caldwell, Chagrin Falls, Ohio, assignors to General Electric Company, a corporation of New York
Filed Aug. 8, 1961, Ser. No. 130,177
11 Claims. (Cl. 321—69)

This invention relates to frequency converter systems. More particularly, it relates to a system for providing an output having a range of determinate frequencies from a variable speed source.

In many situations such as aircraft systems or other arrangements wherein an engine whose speed varies over a wide range is utilized to power an electric generator, it has been desirable to obtain a constant frequency output having a chosen range of determinate frequencies from the variable speed source provided by such engine. Heretofore, the most widely used device for this purpose has been a hydraulic constant speed drive which is essentially a hydraulic generator-motor system that utilizes either a variable displacement generator or a motor in continuously variable ratio over a requisite input speed range.

Such transmissions which are in general use today are quite complex and require extreme precision of moving parts together with associated piping and cooling systems. In addition, the lives of such systems are relatively short and considerable maintenance thereof is required. Also, overhead costs of such systems are high and development costs for new ratings and speed ranges plus the production costs thereof are quite expensive. The speed limitations of these systems serve to inhibit the development of lighter weight systems.

It is, accordingly, an important object of this invention to provide an all-electrical system for converting the indeterminate variable shaft speed provided by an engine or other energy source to an electrical output having a chosen range of determinate frequencies.

It is a further object to provide a system in accordance with the preceding object which is relatively light in weight and has a relatively large power handling capacity.

It is another object to provide a system in accordance with the preceding objects wherein considerable flexibility and selection of input speed range and output frequency is enabled and wherein the efficiency of the system is high.

Generally speaking and in accordance with the invention, there are provided in combination, first means to produce a plurality of like outputs equally displaced in phase and having an indeterminate variable frequency, a source of reference voltage having a given range of determinable frequencies, the highest frequency of the range generally being less than the lowest frequency of the outputs and second means in circuit with the reference voltage source and the first means for mixing the outputs and the reference voltage. There are also included third means in circuit with the first means to produce first signal conditions in response to half cycles of one polarity of the outputs and second signal conditions in response to half cycles of the opposite polarity of the outputs and fourth means in circuit with the second and third means for producing first and second signals during such signal conditions in response to the application of the resultant of the mixing of the outputs and the reference voltage. Means are further included to combine the signals to produce an output having the frequency of the reference voltage.

The features of this invention which are believed to be new are set forth with particularity in the appended claims. The invention itself, however, may best be understood by reference to the following description when taken in conjunction with the accompanying drawings which show embodiments of a frequency converter according to the invention.

In the drawings, FIG. 1 is a block diagram of a system in accordance with the invention;
FIG. 2 is a diagram conveniently utilized for explaining the inventive concept of the system;
FIG. 3 is a block depiction of an arrangement for providing output signals in accordance with a simulated embodiment of the system;
FIGS. 4a–4c are depictions of the circuit symbols utilized in FIG. 3;
FIG. 5 is a diagram of a portion of a modulator which is utilized in the simulated embodiment;
FIG. 6 is a diagram useful in explaining the operation of the system of FIG. 5;
FIGS. 7–12 are schematic diagrams of circuits utilized in the modulator of FIG. 5; and
FIGS. 13–16 taken together as in FIG. 17 is a diagram of another embodiment of the system;
FIG. 18 is a depiction of a waveform useful in explaining the operation of the invention;
FIGS. 19a–19d comprise a timing diagram of waveforms useful in explaining the operation of the invention;
FIGS. 20 and 21 illustrate the feedback feature of the the invention;
FIGS. 22a–22e comprise a timing diagram of waveforms which occur in the operation of the embodiment depicted in FIGS. 13–17; and
FIG. 23 is a logical diagram depicting the operation of the embodiment shown in FIGS. 13–17.

Referring now to FIG. 1, wherein there is shown an embodiment of a system in accordance with the invention, a generator 10 in response to the application thereto of the variable speed power from shaft 12 produces a three phase output, viz., phases $e_1$, $e_2$ and $e_3$ having a frequency in accordance with the speed of shaft 12. The field winding 14 of generator 10 is excited by an exciter 16 which may suitably be of the static type, there being fed back to a voltage regulator contained in exciter 16, the phase $e_1$, $e_2$ and $e_3$ outputs of the generator 10 to provide thereby voltage regulation of the outputs of generator 10.

For providing three outputs from the system which are equally displaced in phase, viz., phases A, B and C, a modulator and a frequency conversion stage are provided for producing each output. Thus, for phase A, there are provided a modulator 18 and a frequency conversion stage 20. For phase B, there are provided a modulator 22 and a frequency conversion stage 24, and for phase C, there are provided a modulator 26 and a frequency conversion stage 28. An oscillator and phase splitter 30 having a three phase output of a given range of determinable frequencies provides a reference frequency voltage for modulators 18, 22 and 26.

In the frequency conversion stages 20, 24 and 28, there are included power switching devices which are rendered conductive in response to switching signals respectively applied thereto to perform the frequency conversions in the system. The outputs of the frequency conversion stages 20, 24 and 28 are combined in combiners 32, 34 and 36, respectively. Since the unfiltered outputs of the combiners contain components having undesired frequencies, the output filters 38, 40 and 42 substantially remove such undesired components.

In the modulators, one of the respective phase outputs of oscillator 30 is mixed with the three phase outputs of generator 10 to provide the proper switching signals for the power switching devices in the frequency conversion stages respectively. The exciter regulator 16 functions to control the excitation in generator 10 so that the proper voltages are applied to the frequency converters.

Oscillator stage 30 contains an oscillator, the frequency of which determines the frequency of the output of the system. The three balanced phase outputs from oscillator stage 30 are derived by means of a phase splitter or like device, which determines the system phase displacement and phase sequence. The frequency of generator 10 is suitably chosen to be about 4 to 20 times the oscillator frequency.

Analog feedbacks of the respective system phase outputs to the corresponding modulators serve to reduce distortion of the output of the system and also to provide a degree of voltage regulation.

In the frequency conversion stages, a plurality of first switching devices is controlled by the positive half cycles of the outputs of generator 10 and another such plurality of second switching devices is controlled by the negative half cycles of the outputs of generator 10. The restraining circuits 44, 46 and 48 serve to insure that no commutation occurs between the respective first and second pluralities of switching devices in an associated frequency conversion stage unless the current in the output of the associated combiner is passing through or already has passed through the zero crossover point. The currents in the outputs of combiners 32, 34 and 36, respectively, are sensed by current transformers 50, 52 and 54, the current in transformers 50, 52 and 54 being fed to restraining circuits 44, 46 and 48 respectively.

In FIG. 2, there is shown a circuit which depicts the circuit relationships in one phase of the system of the invention. In this circuit, the generators 37, 39, 41 produce the three outputs 120° displaced in phase with respect to each other, each output, viz., voltages $e_1$, $e_2$ and $e_3$ having the same varying frequency. The series inductance $l_m$ represents the total commutating inductance of the system. The normally open relay contacts $R_1$, $R_2$ and $R_3$ which represent the nonconductive conditions of the switching devices in a frequency conversion stage of FIG. 1, when they assume the closed position, switch the output of the system from one generator phase to another as effected by gating signals applied to the switching devices (not shown) respectively associated with contacts $R_1$, $R_2$ and $R_3$.

In the operation of the circuit of FIG. 2, the switching devices associated with contacts $R_1$, $R_2$ and $R_3$, respectively, are energized in accordance with the output of a modulator (FIG. 5) wherein the three balanced generator voltages $e_1$, $e_2$, $e_3$ are mixed with a reference voltage having a determinate frequency. Preferably the frequency of the reference voltage is such that the range of frequencies of the generator voltages is about from four to twenty times as great thereof. Of course, three reference voltages are provided where there are three frequency converter stages and are equally displaced in phase with respect to each other as are the generator voltages, the mixing occurring in each phase in the modulator between the three phase generator voltages and one of the reference voltage phases.

The output passed through alternately closed contacts $R_1$, $R_2$ and $R_3$ is filtered through filter inductance $l$ and capacitance $C$ and developed across load inductance $L$ and resistance $R$ to provide the output voltage $e_o$ for a system phase output.

In the circuit of FIG. 2, in the relationships obtaining therein, as shown hereinbelow, classical notation rather than operational notation is utilized to more directly preserve identification between measured quantities and the physical components of the actual system. The relationships are:

$$e_1 = e_1 \sin 2\pi f_g t; \quad e_2 = a^2 e_1; \quad e_3 = a e_1; \quad a = e^{j120°}$$

where $f_g$ = generator frequency
$e_o = e_o \sin 2\pi f_o t$ where $f_o$ = output frequency
$l_m \cong l''_d$ with amortisseurs (generator sub-transient inductance)
$l_m \cong l'_d$ with no amortisseurs (generator transient inductance)
$l$ = filter inductance
$L$ = load inductance
$C$ = filter capacitance
$r$ = equivalent resistance of the core loss in inductance $l$
$R$ = load resistance The current equations of the system are:

$$i = \sum \frac{1}{l_m} \int (e_i - e') \, dt \tag{a}$$

$$i = \frac{1}{l} \int (e' - e_o) \, dt + \frac{1}{r} (e' - e_o) \tag{b}$$

$$i = \frac{1}{L} \int e_o \, dt + C \frac{de_o}{dt} + \frac{1}{R} e_o \tag{c}$$

where $e_i = e_1$, $e_2$ or $e_3$ whichever is connected to the filter input at the time considered.

Equation $a$ represents the current flowing in the generator and may consist of: no currents, current in one phase or current in two phases depending upon the condition of the system at the time considered. Equation $b$ represents the sums of the currents flowing through the inductance and resistance branches, $l$ and $r$ of FIG. 2. Equation $c$ represents the total current flow into the shunt branches $C$, $R$ and $L$ in FIG. 2.

When Equations $a$ and $b$ are solved simultaneously, there results:

$$e' = \sum \left[ \frac{r}{l_m} \int (e_i - e') \, dt \right] - \frac{r}{l} \int (e' - e_o) \, dt \tag{d}$$

and when Equations $b$ and $c$ are solved simultaneously, there results:

$$e_o = \int \left[ \frac{1}{lC} \int (e' - e_o) \, dt - \frac{1}{LC} \int e_o \, dt + \frac{1}{rC} (e' - e_o) - \frac{1}{RC} e_o \right] dt \tag{e}$$

In FIG. 3, there is shown a circuit for producing the three balanced generator voltages $e_1$, $e_2$ and $e_3$ and output voltages $e_o$ and $e'$ as set forth in Equations $d$ and $e$.

In FIGS. 4a, 4b and 4c, there are shown the symbols utilized in depicting the system elements in the circuit of FIG. 3.

In the circuit of FIG. 3, Equation $d$ is represented by integrators 58, 60, 62 and 66 and summers 64 and 68. The outputs of integrators 58, 60 and 62 are respectively equal to the currents in phases $e_1$, $e_2$ and $e_3$ multiplied by the factor "$r$" (FIG. 2). The output of integrator 66 is the factor "$r$" times the current in the inductive branch of the series filter inductor $l$ (FIG. 2), and the current in the resistive branch of the series filter is the factor $$\frac{"l"}{r}$$

times the difference between $e'$ and $e_o$. The system output voltage is $e_o$.

Equation $e$ is represented in FIG. 3 by integrators 76 and 86 and summer 78. The potentiometers 49, 51, 53, 65, 70, 72, 74, 80, 82 and 84 may be utilized in varying the system loading with each potentiometer being a loading element. Integrators 43 and 47, together with summers 45, 55 and 56 provide the three phase voltage source, viz., voltages $e_1$, $e_2$ and $e_3$.

In FIG. 5, there is shown a portion of a modulator circuit which may be utilized with the computer circuit of FIG. 3. The circuit of FIG. 5 essentially has two functions, viz., the supplying of the necessary information to fire the simulated switching devices therein, (silicon controlled rectifiers being the type of devices that are simulated) according to a predetermined schedule (as modified by an analog feedback signal) and to provide additional logic to the simulated silicon controlled rectifiers whereby they properly perform all the functions of silicon controlled rectifiers.

In this figure, the output of one phase of a polyphase variable frequency oscillator 90, which can be conveniently designated as voltage $e_{fa}$ is applied through a resistor 92 as one input to a D.C. amplifier 96. Also, applied through resistors 93 and 95 as inputs to D.C. amplifier 96 are the generator phase outputs $e_1$ and $e_3$. Resistor 93 is chosen to have a value which is twice the value of resistors 92 and 95. Since signals $e_1$ and $e_3$ are 120° displaced in phase with respect to each other, the output of amplifier 96 may be conveniently designated as $-e_M = -e_{fa} - \cos e_1$. In FIG. 18 there is shown the wave shape of the signal $e_M$. In this wave shape, if the amplitude of the output of the oscillator wave is taken to have a value of "one," then the amplitude of the generator voltage superimposed thereon is "one-half." The positive gate threshold line in FIG. 18 also has an amplitude of one-half and indicates the voltage level above which a silicon controlled rectifier controlled by a positive half cycle of generator voltage is switched into conductivity. The line in FIG. 18 designated "negative gate threshold" indicates the voltage below which a silicon controlled rectifier controlled by the negative half cycles of generator output is switched into conductivity.

It is to be noted that the generator signal superimposed on the oscillator signal in FIG. 18 is a cosinusoid. This is readily appreciated that from the fact that since $e_1$ and $e_3$ are 120° displaced in phase with respect to each other and since the value of resistor 93 is twice that of resistor 95, the summing in amplifier 96 provides the cosinusoid of the $e_1$ voltage.

Prior to describing the remainder of the modulator of FIG. 5, it is to be realized that the purpose of this modulator is to construct a firing schedule which will produce the best sine wave power output for a given filter or, conversely, to produce a sine wave of a given quality with the least filtering. In this connection, it is to be noted that the filter itself is not the only part affected. Thus, if the filter series inductance increases in size, the generator must also increase in size to supply the added voltage drop across such inductance.

It has been found that if the generator output is directly superimposed on the reference oscillator wave, in the event that there are present different power factors in the generator output, the sine waves from the generator superimposed upon the oscillator wave are distorted. Accordingly, it is first desired to vary the firing angle of the switching device as a function of the instantaneous height of the firing curve.

The latter can be accomplished by producing a cosinusoid from the generator voltage and utilizing it, as shown in FIGS. 19a–d. In FIG. 19a there is shown a half cycle of voltage from a generator output. In FIG. 19b, there is shown a cosine wave derived from the wave of FIG. 19a with no offset. In FIG. 19c there is shown the same cosine wave with an offset whereby the gate threshold is at the crossover point of half cycles of the cosinusoid. In FIG. 19d, there is shown a cosinusoid wave with an offset whereby the gate threshold is at the most negative point of the wave. It is seen from FIGS. 19c and 19d that if a cosinusoid having the same frequency as the generator output is varied up and down with an offset, the point at which the switching device is actuated can readily be varied from 0° to 180°. Thus, if the cosinusoid is added to the oscillator wave as shown in FIG. 18, the firing angle can be made to progress smoothly from conduction periods of 0° to full conduction and back to 0° as the curve rises and falls.

To obtain such performance, gate thresholds and magnitudes are set as has been described in connection with FIG. 18. In FIG. 18, the amplitude of the oscillator wave, is taken to be one, the amplitude of the cosinusoid taken to be one-half and the amplitudes of the positive and negative gate thresholds, respectively, are plus and minus one-half. With this arrangement, there is enabled a variation of conduction angle in the switching device as a function of the instantaneous oscillator wave magnitude.

It is also desired to shape the firing curve as a function of load and power factor to produce the best sine wave output from the filter. It is realized that a modulator and a frequency conversion stage (FIG. 1) together provide a power amplifier of considerable power gain as shown in FIG. 20. Parts of the converter are extremely non-linear but the operation desired is that of a high power linear amplifier. To linearize the power amplifier, feedback is utilized such as shown in FIG. 21. With feedback, the power gain is reduced. However, the obtainable power gain with switching devices is very great. Accordingly, the power of the reference voltage may be small proportionately.

The feedback signals obtained from the output voltage (FIG. 21) may be considered as consisting of two parts; a first type feedback comprising the fundamental output frequency and its harmonics and a second type feedback comprising the modulated ripple voltage derived from the multiple switching of the generator voltages. The system described herein operates reasonably well with only the first type of feedback. This feedback regulates the output voltage and improves the wave shape somewhat. However, when the second type feedback is also utilized, the output wave shape is greatly improved and the stability margin is improved, this improvement of the stability margin permitting the first type feedback to be appreciably increased. When the second type feedback is utilized by itself, it effects an appreciable improvement in wave shape although the voltage regulation is not as complete as may be desired. Thus, the combination of both types of feedback give the best overall results.

The second type of feedback is helpful in improving wave shape because it is carrying intelligence to each switching device, i.e., each silicon controlled rectifier. The steep slope of such modulated ripple makes its effect very definitive. The second type feedback is especially helpful in correcting wave shape with a low power factor load.

Thus, with feedbacks as set forth, a sine wave input from the generator and filtering, the needed shaping of the firing curve for the switching device to produce a sinusoidal power output for a minimum filter size is obtained for any load condition. It is to be noted that using both types of feedback provides the following advantages:

(1) The feedback shapes the output wave to correspond closely to the oscillator wave input, the voltage regulation function being obtained automatically with a response time of much less than a cycle of the power output sine wave.

(2) Since the feedback has in effect provided a linearized amplifier, the power output waveform closely conforms to any input reference oscillator waveform of any frequency up to a fraction of the relatively high generator frequency. With this arrangement, high power square waves, sawtooth waves and other complex waveforms are obtainable.

Referring now back to the modulator depicted in FIG. 5, it is seen that expression $$\frac{e_1}{+2}+e_3$$

produces the cosine of $e_1$.

Applied as inputs to D.C. amplifier 102 through resistors 98 and 100 are the signals $e_1$ and $-e'$ as derived from the computer shown in FIG. 3. Produced at the output of amplifier 102 is the signal $-e_r$ which is the negative voltage across a simulated back to back silicon controlled rectifier pair, $e_r$ being equal to $e_1-e'$. The signal $-e_I$ is the negative of a voltage proportional to the current from the output of phase $e_1$ and is the $-ri_1$ signal from the computer in FIG. 3.

To understand the relationship of the circuit of FIG. 5 to the system of FIG. 1, it is to be understood that there is shown in FIG. 5 only a portion of a modulator for mixing one of the generator outputs, for example, the $e_1$ output with a phase output of the reference voltage oscillator. The portion of the modulator shown in FIG. 5 determines the firing schedule for a back to back pair of switching devices in circuit with the $e_1$ phase output of the generator. By the term "back to back" pair of switching devices is meant a pair of switching devices where one is switched into conductivity during the positive half of a cycle of a generator output and the other is switched into conductivity during the negative half of such cycle. Thus, the back to back pair of devices, one of which is conveniently designated as $R_p$, i.e., the device which is switched into conductivity during the positive half cycle of a generator output, and the other of which is designated $R_n$, i.e., the device which is switched into conductivity during the negative half cycle of the same generator output are suitably in circuit with a generator output such as $e_1$ to effect such switching. The devices that are simulated are silicon controlled rectifiers.

To provide a single phase output of a system, each modulator, therefore, would include a circuit such as shown in FIG. 5 for each back to back pair of switching devices, the number of each back to back pair of switching devices being determined by the number of balanced phase outputs respectively from the generator. Thus, for each phase of system output, i.e., outputs having the frequency and phases of the outputs reference oscillator, there would be required a modulator, each modulator comprising a number of circuits such as that depicted in FIG. 5, such number being equal to the number of back to back pairs of switching devices in the frequency converter for each stage, i.e., the number of different phase outputs of the generator.

The $-e_M$ signal is supplied to a neutral zone circuit comprising series connected unidirectional potential sources 101 and 103 in shunt with the series connected diodes 105 and 107, the $-e_M$ signal being applied to the junction 109 of the cathode of diode 107 and the anode of diode 105. There is taken from the junction 111 of sources 101 and 103, the signal $-e'_M$.

The signal $e_{G1}$ which is the $e_1$ output of the computer of FIG. 3 is applied to an input sensing amplifier 108. Sensing amplifier 108 is suitably an amplifier which normally provides approximately zero volts output when the input thereto is less than zero and a minus voltage, say about $-6$ volts when the input is equal to or exceeds zero volt. Consequently, amplifier 108 inverts the $e_{G1}$ voltage and the output thereof is a square wave which is at a minus voltage when $e_{G1}$ is positive and at zero volt when $e_{G1}$ is negative. If zero volt at the output of amplifier 108 is taken to be a binary "one," and the minus voltage, such as about $-6$ volts, is taken to be a binary zero, then the output of amplifier 108 may be designated as the signal $\overline{G}$.

The signal $\overline{G}$ is applied to a logic stage 110 which may be designated a NAND circuit, the latter being the type logic circuit generally used in the circuit of FIG. 5. In the NAND circuit 110, a zero input thereto provides a minus volts output (binary zero), and a minus volts input thereto provides a zero volt output (binary one). The equations for the function of a NAND circuit may be written as $x=\overline{a}+\overline{b}$, $x=\overline{a.b}$ and $\overline{x}=a.b$ wherein $x$ is the output and $a$ and $b$ are inputs. Consequently, the signal $\overline{G}$ at the output of amplifier 108 is inverted in logic circuit 110 to provide the signal G.

The signal $-e'_M$ is applied to a sensing amplifier 104. Amplifier 104 is a circuit similar to the circuit of stage 108 and which provides a minus volts output when the input thereto is equal to or greater than zero volt and a zero volt output when the input thereto is less than zero volt. In this amplifier, accordingly, only the negative going portion of signal $-e'_M$ is amplified and inverted to provide a signal conveniently designated as $M_p$ which is the basic firing signal for the positive controlled switching device $R_p$.

The signal $-e'_M$ is also applied to a sensing amplifier 106 wherein the negative portion of the signal $-e_M$ is clipped and only the positive going portion is inverted and amplified to provide the signal conveniently designated as $\overline{M}_n$. The signal $\overline{M}_n$ is inverted in a logic circuit 112 which is a circuit the same as circuit 110, to provide the signal $M_n$ which is the basic firing signal for the negative controlled switching device. Circuit 106 is one wherein a zero volt output (binary one) is produced when the input thereto is equal to or less than zero volt and a minus volts output (binary zero) is produced when the input thereto exceeds zero volt.

The $-e_r$ signal is applied to an input sensing amplifier 114 similar to that of stages 104 and 108 wherein the negative portion of the signal $e_r$ is clipped and the positive portion is amplified and inverted to provide the signal $r$. Signal $r$ is inverted in a logic circuit 116 which is the same as the circuits of the other logic stages, such as stages 110 and 112, to provide the signal $\overline{r}$.

The signals $\overline{G}$, $M_n$ and $\overline{r}$ are applied to a logic circuit 118 to provide at the output thereof the signal $\overline{GM_n\overline{r}}$ and the G, $M_p$ and $r$ signals are applied to a logic circuit 120 to provide at the output thereof the signal $\overline{GM_p r}$.

The $\overline{GM_n\overline{r}}$ signal is applied through a differentiating circuit comprising a series connected capacitor 122 and a parallel connected resistor 124 and thence through the cathode to anode path of a diode 126 to provide sharp negative pulses occurring at the leading edges of the pulses fed into the differentiating circuit, these sharp pulses being applied to an amplifier 128. The output of amplifier 128 energizes relay $R_n$ which is the negative controlled switching device of the back to back pair of switching devices to effect the closing of normally open contacts $R_{n1}$.

The $-e_I$ signal which is the $-ri_1$ signal provided from the circuit of FIG. 3 and is the negative of a voltage proportional to the current from the $e_1$ generator output voltage is applied to a sensing amplifier 130. Such signal can be applied to sensing amplifier 130 since the energization of switching device $R_n$ by amplifier 128 has caused normally open contacts $R_{n1}$ associated therewith to close. Sensing amplifier 130 comprises a circuit which provides a binary one output (zero volt) when the input thereto is equal to or less than zero volt and a binary zero output (such as $-6$ volts) when its input is greater than zero volt. Accordingly, in sensing amplifier 130, the negative portion of the $-e_I$ signal is clipped and the positive portion is amplified and inverted. The output signal of sensing amplifier 130 may be designated as $\overline{I}_n$ and is negative whenever current flows through switching device $R_n$. This $\overline{I}_n$ signal when applied to amplifier 128 maintains switching device $R_n$ in its energized state after the negative pulse from diode 126 decays. Switching device $R_n$ becomes deenergized when the current signal $-e_I$ dies out. The latter deenergization occurs before the next negative pulse from diode 126.

The $\overline{GM_p r}$ signal is differentiated by a series connected capacitor 132 and a parallel connected resistor 134 and the differentiated signals resulting therefrom which comprise a train of sharp negative pulses occurring at the leading edges respectively of the pulses from the output of logic circuit 120 are applied through the cathode to anode path of a diode 136 to a sensing amplifier 138. Sensing amplifier 138 is a circuit which provides a binary one output (zero volt) when the input thereto is negative and a binary zero output such as $-6$ volts when the input thereto is equal to or more than zero volt.

It is to be understood that in the signal designation, the term $R_n$ signifies the energized state of the switching device $R_n$, and the term $\overline{R_p}$ signifies the energized state of switching device $R_p$.

It is seen that the signal $\overline{GM_p r}$ is the negative of the expression which is required to fire the positive controlled switching device $R_p$ (as will be further explained). Thus the $R_p$ signal is the inversion of $GM_p r$ signal. This $R_p$ signal at the output of sensing amplifier 138 is inverted in an amplifier 140 which is a circuit the same as amplifier 128. The $R_p$ signal which is a binary one or zero volt output causes the deenergization of switching device $R_p$. Accordingly, when it is so deenergized, the $-e_I$ signal is applied to sensing amplifier 138 through normally closed contacts $R_{p1}$, the positive portion of the $-e_I$ signal is clipped and the negative portion is amplified and inverted in stage 138. This positive signal from stage 138 is inverted in amplifier 140 to provide zero output therefrom and relay $R_p$ is held deenergized until the current from the $-e_I$ signal falls to zero.

In FIG. 6 there is shown the arrangement for combining the signals for energizing devices $R_n$ and $R_p$. It is seen from this figure that when the $R_n$ signal is present, the $R_{n1}$ normally open contacts close and current flows through relay coil $R_1$ and when the $R_p$ signal is present, $R_p$ is deenergized and the normally closed contacts $R_{p1}$ remain closed and current also flows through relay $R_1$.

In FIG. 7 there is shown a circuit suitable for use as the sensing amplifiers of stages 104, 108 and 114 of FIG. 5. In this circuit, the input is applied to the base 144 of a PNP transistor 142 through a resistor 146. Base 144 is connected to a positive potential source 148 through a resistor 150, the emitter 152 is connected to ground and the collector 154 is connected to a negative potential source 158 through a resistor 156. A plurality of outputs may be taken at collector 154.

Transistor 142 is biased for operation whereby with an input equal to or greater than zero volt applied at base 144, the output at collector 154 has a minus volts value, suitably about $-6.0$ volts (a "0"). When the input at base 144 is less than zero volt, the output at collector 154 is about zero volt (a "1").

In FIG. 8, there is shown a circuit suitable for use as the sensing amplifier of stage 106 in FIG. 5. In this circuit, the input is applied through a resistor 160 to the base 164 of a transistor 162. Base 164 is connected to a source of negative potential 166 through a resistor 168, and may be connected to a source of positive potential 170 of a chosen value through the anode to cathode path of a diode 173 (shown in dashed lines) whereby the potential at base 164 is positively clamped to the potential from source 170. The emitter 172 is connected to ground and the collector 174 is connected to a negative potential source 166 through a resistor 176. A plurality of outputs may be taken at collector 174.

In the operation of the circuit of FIG. 8, transistor 162 is so biased for operation whereby an input at base 164 having a value of zero volt or a minus voltage provides an approximately zero volt output at collector 174 which may be designated as a binary one. A voltage at base 164 which exceeds zero volt provides a negative voltage output, suitably about $-6$ volts at collector 174, such output being conveniently designated as a binary zero.

In FIG. 9, there is shown a circuit suitable for use as the sensing amplifier of stage 138 of FIG. 5. In this circuit the inputs are applied to the base 180 of a PNP transistor 178 through resistors 182 and 184 respectively, base 180 being connected to a source of positive potential 186 through a resistor 188. The emitter 190 is connected to ground and the collector 192 is connected to a negative potential source 194 through a resistor 196.

In this circuit, transistor 178 is so biased for operation whereby upon the application of a voltage which has a value less than zero volt to base 180, an approximately zero volt output is produced at collector 192, such output being conveniently designated as a binary one. Where the voltage applied to base 180 is equal to or greater than zero, there is produced at collector 192, a voltage which has a minus value, suitably $-6$ volts and which may be conveniently referred to as a binary zero. The logic equation for the circuit of FIG. 9 may be described as $x = \overline{a} + \overline{b}$ wherein $x$ is the binary one output and $a$ and $b$ are separate binary zero inputs, the $b$ input actually being an analog quantity where $b=1$ (binary) when its voltage is equal to or greater than zero volt and $b=0$ (binary) when it is a negative voltage.

In a circuit of FIG. 10, there is shown a sensing amplifier suitable for use in stage 130 of FIG. 5. In this circuit, the inputs are applied through resistors 206 and 208 to the base 202 of a transistor 198, base 202 being connected to a source of negative potential 210 through resistor 212. The emitter 200 is connected to ground and the collector 204 is connected to source 210 through a resistor 214.

Transistor 198 is so biased for operation whereby when the input to base 202 exceeds zero volt, the output at collector 204 is a negative voltage quantity, such as about $-6$ volts (binary 0). When the input to base 202 is equal to or less than zero volt, the output at collector 198 is about zero volt, i.e., a binary one. The logic equation for the amplifier of FIG. 10 may be stated as $x = \overline{a} + \overline{b}$. The $b$ voltage input is an analog quantity and may be defined as; $b=1$ (binary) when its value exceeds zero volt and $b=0$ (binary) when its value is equal to or less than zero volt.

The circuit of FIG. 11 is suitable for use as a circuit in the logic stages of FIG. 5 such as stages 110, 112, etc. Such circuit is conveniently designated as a NAND type which in effect includes an AND function followed by a NOT function or negation. In this circuit, the $a$ and $b$ inputs are applied through resistors 240 and 242 to the base 246 of a transistor 244, base 246 being connected to a positive potential source 248 through a resistor 250. The collector 252 is connected to a negative potential source 254 through a resistor 256 and the emitter is connected to ground. The equations for the circuit of FIG. 11 may be stated as output $x = \overline{a} + \overline{b}$, $x = \overline{a.b}$ and $\overline{x} = a.b$.

In FIG. 12, there is shown a circuit suitable for use in the amplifier stages 128 and 140 of FIG. 5. In this circuit, the inputs are applied through resistors 224 and 226 to the base 218 of a PNP transistor 216. The emitter 220 is connected to ground and the collector 222 is connected to a source 228 of negative potential through the switching device being actuated and depicted as a relay coil 230, coil 230 being shunted by the cathode to anode path of a diode 231 to clamp collector 222 at the potential of source 228 and to eliminate inductance surge. The base 218 is connected to a source of positive potential 234 through a resistor 232.

In this circuit, transistor 216 is so biased for operation whereby a negative input to base 218 provides current through coil 230 whereby it is energized. The logic equations in the circuit of FIG. 12 may be written as, $R = \overline{a} + \overline{b}$ and $\overline{R} = a.b$ wherein R signifies the energized state of coil 230 and $\overline{R}$ signifies the deenergized state of coil 230. Utilizing the designation of the signals as shown in connection with amplifier 128 in FIG. 5, then the logic equations for the circuit of FIG. 12 becomes $$R_n = \overline{GM_n\overline{r}} + I_n R_n$$

since the input to amplifier 128 is $\overline{GM_n\overline{r}} + \overline{I}_n$.

Reference is now made to the circuit of FIG. 5 for an explanation of the operation thereof. It is recalled that the function of this circuit is to provide a schedule for firing switching devices $R_n$ and $R_p$ schematically depicted as relay coils but together behaving as a back to back pair of switching devices such as silicon controlled rectifiers, thyratrons and the like.

The contacts designated $R_1$ in the circuit of FIG. 2 and the two pairs of contacts $R_1$ shown at the input at integrator 62 in the circuit of FIG. 3 depict the equivalent of the operation of a back to back switching device pair.

The input signals to the circuit of FIG. 5 as previously explained are received from the circuit of FIG. 3. They are $e_1 = e_{G1} =$ one generator voltage phase. The term $-e'_M =$ the resultant of the mixing of the one phase of the output of oscillator 90 and the cosinusoid of $e_1$ (in this example, one half voltage $e_1$ plus $e_3$), and the providing of two thresholds by clipping out the mid-region of the $-e_M$ signal by the neutral zone circuit. The signal $-e_r$ is the negative of the voltage across a switching device pair where $e_r$ equals $e_1 - e'$. The voltage $-e_I$ is the negative of a voltage proportional to the current from the output phase $e_1$.

These analog input signals are fed into sensing amplifiers which convert them to on-off, i.e., digital signals. The latter digital signals are mixed and fed through logic amplifiers until the final result is the operation of the output switching device pair ($R_n$ and $R_p$) in FIG. 5.

As previously explained above, two digital states are described as binary one and binary zero. Binary one signifies the presence of a signal and is a state when the circuit voltage is approximately zero volt. The binary zero state signifies the absence of a signal and exists when the voltage is approximately a suitable negative voltage such as about $-6$ volts.

The conditions for the operation of switching device $R_p$ which may represent a silicon controlled rectifier having its anode connected to the $e_1$ generator voltage, i.e., it may represent the positive controlled rectifier in a back to back pair and for the operation of switching device $R_n$ which may represent a silicon controlled rectifier having its cathode connected to the $e_1$ generator voltage, i.e., it may represent the negative controlled rectifier of the back to back pair are as follows:

*Conditions for Effecting Conduction in Positive Controlled Device $R_p$*

Positive firing signal is present—$M_p$
(Derived from input $-e_M$); and the switching device pair voltage is positive—$r$
Derived from $-e_r$; and the generator voltage $e_{G1}$ (same as $e_1$) is positive—$G$
Or current $i_1$ is present and positive—$I_p$
(The $I_p$ signal can only be true if the contacts $R_{p1}$ associated with the positive controlled rectifier are closed and current starts to flow (derived from $-e_I$).

*Conditions for Effecting Conduction in Negative Controlled Device $R_n$*

Negative firing signal is present—$M_n$
(Derived from $-e_M$); and switching device pair voltage is negative—$\overline{r}$
(i.e., anode of the negative controlled silicon controlled rectifier would be positive, derived from $-e_r$); and the generator voltage $e_{G1}$ is negative—$\overline{G}$
(The condition for the negative controlled rectifier to have positive anode voltage); or Current $i_1$ is present and negative—$I_n$
(The $I_n$ signal is true only after the contacts $R_{n1}$ associated with the negative controlled rectifier are closed and current starts to flow, such current being derived from $-e_I$).

Thus, the following equations may be written:

$$R_p = M_p r G + I_p R_p \quad (1)$$

$$R_n = M_n \overline{rG} + I_n R_n \quad (2)$$

$$R_1 = R_p + R_n \quad (3)$$

$$R_1 = M_p r G + I_p R_p + M_n \overline{rG} + I_n R_n \quad (4)$$

Equation 4 stands for the proposition that relay $R_1$ (FIG. 6) is actuated when signals $M_p$ and $r$ and $G$ are concurrently present or have been present (to produce $R_p$) and $I_p$ is present or the signal $M_n$ is present and concurrently the signals $r$ and $g$ are not present, or this combination has been in existence (to produce $R_n$) and the signal $I_n$ is present.

In connection with Equation 4, it is to be noted that the $I_p$ and $I_n$ terms do not cause the actuation of relay $R_1$ since the currents responsible for these terms cannot flow until the relay $R_1$ is already actuated. Thus, these terms function to hold relay $R_1$ actuated until the current drops to zero. This is a characteristic inherent in a switching device such as a thyratron or a silicon controlled rectifier $R_1$ of FIG. 3.

In the circuit of FIG. 5, as has been set forth hereinabove, input voltage $e_{G1}$ may vary widely in frequency but in general is many times greater than the reference voltage frequency from oscillator 90 and consequently, equally many times greater than the output frequency of the system. The $e_{G1}$ signal is amplified and inverted by sensing amplifier 108. Since the voltage to switch amplifier 108 on and off may be chosen to be relatively small, such as about one volt, compared to the magnitude of the $e_{G1}$ voltage, the output of amplifier 108 is essentially a square wave and is negative (binary zero) when voltage $e_{G1}$ is positive and positive (binary one) when voltage $e_{G1}$ is negative. This provides the signal $\overline{G}$ appearing in Equations 2 and 4 above. The $\overline{G}$ signal is inverted in logic circuit 110 to produce the signal $G$ appearing in the Equations 1 and 4.

The input sensing amplifier 106 amplifies and inverts only the positive portion of the $-e'_M$ voltage and its output accordingly becomes $\overline{M}_n$ or the inverse (negative). The $\overline{M}_n$ signal is inverted by logic circuit 112 to produce the $M_n$ signal which is the basic firing angle signal for the negative controlled switching device.

The signal $-e'_M$ is also fed into the sensing amplifier 104 whereby only the negative going portion of the $-e'_M$ signal is amplified. The output of amplifier 104 is the signal $M_p$ which is the basic firing signal for the positive controlled switching device.

The signal $-e_r$, i.e., the voltage across a back to back pair of switching devices is amplified and inverted by sensing amplifier 114 to produce the signal $r$ which is inverted in logic circuit 116 to provide the signal $\overline{r}$.

The signals $\overline{G}$, $M_n$ and $\overline{r}$ are fed into logic circuit 118 to produce the signal $\overline{GM_n \overline{r}}$. From Equation 2 it is seen that this is the negative of a term required to actuate the negative controlled switching device.

The differentiating circuit comprising capacitor 122 and resistor 124 produces short duration negative going pulses at the leading edges of the wider pulses fed into the differentiating circuit. Each of these negative going pulses are amplified in amplifier 128 and the output thereof actuates switching device $R_n$ representing conduction therein. The contacts $R_{n1}$ associated with switching device $R_n$ close upon the energization of device $R_n$ to permit the signal $-e_I$ to be fed into sensing amplifier 130. Since amplifier 130 is biased for operation whereby it only amplifies positive signals, the output of amplifier 130 is the signal $\overline{I_n}$. This signal is negative whenever the negative current is flowing and is the correct polarity to hold the switching device $R_n$ actuated even after the negative pulse from the differentiating circut decays. After the signal $-e_I$ decays, device $R_n$ becomes deenergized, such deenergization occurring prior to the next pulse from the output of the differentiating circuit.

The signals G, $M_p$, and $r$ are fed into logic circuit 120. Its output is accordingly $\overline{GM_pr}$. This term is the negative of the expression required to fire the positive controlled switching device as shown in Equation 1. The signal $\overline{GM_pr}$ is differentiated in the differentiating circuit comprising capacitor 132 and resistor 134 with the pulses resulting therefrom being applied to sensing amplifier 138. In amplifier 138, the pulses are inverted, the output of sensing amplifier 138 being applied to output amplifier 140, the output of amplifier 140 causing the deenergization of switching device $R_p$. Thus, the term $R_p$ represents the open or deenergized state of device $R_p$ and term $\overline{R_p}$ represents its actuated state. When switching device $R_p$ is in the deenergized state, the normally closed contacts $R_{p1}$ associated therewith permit the application of the $-e_I$ signal to sensing amplifier 138. Since this amplifier only senses the negative portion of the signal $-e_I$, such sensing is the correct polarity for the $-e_I$ signal to hold device $R_p$ in the unactuated state until the current drops to zero. The wave shapes of signals at the various points in the circuit of FIG. 5 are shown therein.

In FIGS. 13–16 taken together as in FIG. 17 there is shown a depiction of another embodiment of a system according to the invention wherein silicon controlled rectifiers are utilized as the switching devices to provide frequency conversion. These figures show the details of a modulator for providing one of three phase power outputs from the system, viz., the phase A output. It is, of course, to be realized that modulators similar to those utilized in providing the phase A output are utilized to provide the phase B and phase C outputs.

In FIGS. 13–17, generator 300 provides the outputs $e_{G1}$, $e_{G2}$ and $e_{G3}$, these outputs being 120° displaced in phase with respect to each other. The field coil 302 for generator 300 is energized by an exciter 304 which may suitably be of the static type. The three generator outputs are fed back to a voltage regulator contained in stage 304 for providing voltage regulation of the outputs of the generator.

The primary winding 309 of a transformer 310 is connected between the $e_{G3}$ and $e_{G2}$ output lines, the voltage appearing at the upper terminal of a center-tapped secondary winding 311 being applied to summing point 312 through a resistor 314. The windings of transformer 310 are so poled whereby the waveform appearing at summing point 312 is 90° displaced in phase with respect to the $e_{G1}$ signal, i.e., the $e_{G1}$ cosinusoid which is utilized to establish the firing schedules for the silicon controlled rectifiers associated with the $e_{G1}$ output of generator 300.

Also, applied to the summing point 312 through a resistor 316 is the phase A output of a three phase sine wave reference oscillator and phase splitter 320. Oscillator 320 is chosen to have a range of determinable frequencies which is the desired output range of frequencies, the highest frequency of such range being substantially less than the lowest frequency provided from the output of generator 300. The oscillator output for summing point 312 is taken from the lower terminal of the secondary winding of transformer 320A.

Also applied to the summing point 312 through a resistor 318 is the phase A system output, such output being applied from an autotransformer 322 to provide analog feedback as an input to the modulator. It is understood that the signal appearing at summing point 312 is utilized to produce the gating signal for the positive controlled silicon controlled rectifier 400 associated with the $e_{G1}$ generator output. By the term "positive controlled" is meant that silicon controlled rectifier 400 is gated into conductivity during a positive half cycle of the $e_{G1}$ generator output.

To provide a similar signal such as that appearing at junction point 312 in order to produce a gating signal for the negative controlled silicon controlled rectifier 404 associated with the $e_{G1}$ generator output, the signal appearing at the lower terminal of secondary winding 311 of transformer 310 is applied to summing point 330 through a resistor 326. The signal appearing at the polarity dot terminal of the secondary winding of transformer 320A is applied to point 330 through a resistor 324 and the signal appearing at the undotted terminal of autotransformer 322 is applied to point 330 through a resistor 328.

It is seen that the signal at summing point 330 is of the opposite polarity as the signal appearing at summing point 312 because of the poling of secondary winding 311, the poling of the secondary winding of transformer 320A and the poling of autotransformer 322.

The signal appearing at junction point 312 is applied to the base 334 of a transistor 332, transistor 332 having an emitter 336 connected to ground and a collector 337 connected to a source of positive potential 339 through a resistor 331. The base 334 is connected to positive potential source 339 through a resistor 340 and is negatively clamped to ground through the cathode to anode path of a diode 342. The values of the circuit components associated with transistor 332 are such whereby in the quiescent state, base 334 is positively biased and transistor 332 conducts at saturation but when current into base 334 goes slightly negative, transistor 332 is rendered nonconductive. The output appearing at collector 337 is applied directly to the collector 354 of a transistor 350 as will be further explained hereinbelow.

Applied to the base 345 of a transistor 344 through a resistor 346 is the voltage appearing at the anode 402 of silicon controlled rectifier 400 and also applied to base 345 through a center tapped winding 348 and a resistor 347 is the signal appearing at the cathode 401 of silicon controlled rectifier 400. In transistor 344, the collector 349 is connected to the positive source 339 through a resistor 351, the emitter 353 is connected directly to ground and the base 345 is connected to ground through the cathode to anode path of a diode 355, diode 355 serving to negatively clamp to ground base 345. The output appearing at collector 349 is applied to base 352 of transistor 350.

It has been stated above that the output of collector 337 of transistor 332 is directly applied to collector 354 of transistor 350. In transistor 350, the emitter 356 is connected to ground and the base is connected to a negative potential source 358 through a resistor 360. Also applied to base 352 through a resistor 362 is an output of a reverse current restraining or inhibit circuit 398, such circuit providing a positive output when current is still flowing in the negative controlled rectifiers as will be further explained hereinbelow.

The output at collector 354 is applied through series connected capacitor 364 to the base 368 of a transistor 366.

In transistor 366, the emitter 370 is connected to ground, a series arrangement of resistors 372 and 374 being connected between ground and negative source 358. The base 368 is connected to the junction 373 of resistors 372 and 374 through the series arrangement of a feedback winding 376 of a blocking oscillator transformer 378 and a resistor 377. The collector 380 is connected to positive source 339 through the parallel combination of a winding 379 of transformer 378 and the series arrangement of a resistor 382 and the anode to cathode path of a diode 384. The upper terminal winding 381 of transformer 378, i.e., the polarity dot terminal is connected to the gate electrode 403 of silicon controlled rectifier 400 through a resistor 386 and the lower terminal of winding 381 is connected to the cathode 401 of silicon controlled rectifier 400.

Considering the operation of that portion of the modulator required to provide the gating signal for silicon controlled rectifier 400, viz., transistors 332, 344, 350, and 366 and their associated circuit components, the voltage from the reference oscillator applied through resistor 316 to summing point 312 produces a current at the summing point which may suitably be designated as $-I_F$. The cosine timing wave applied through resistor 314 to summing point 312 produces a current thereat which may be suitably designated as $-I_{AC}$. The sum of these two currents analogous to the voltage $e_M$ of FIG. 5, has a similar phase except that it is of the opposite polarity. The analog feedback signal, which contains both the fundamental output frequency and its harmonics and the modulator ripple voltage derived from the multiple switching of the generator voltages and applied to summing point 312 through resistor 318 provides a current, $I_o$, at summing point 312 in accordance therewith.

Since transistor 332 is arranged to conduct at saturation when its base is substantially at zero volt or slightly higher (0.5 volt) and to be nonconductive at a voltage slightly below zero volt (such as −0.5 volt) a negative signal appearing at summing point 312 renders transistor 332 nonconductive whereby the positive potential appearing at collector 337 is applied to collector 354 of transistor 350.

In transistor 350, the negative potential applied to base 352 through resistor 360 provides a negative D.C. threshold. In transistor 344, to base 345 there are supplied through resistors 346 and 347 respectively, currents in accordance with the signals appearing at the anode 402 and cathode 401 of silicon controlled rectifier 400. The output at collector 349 of transistor 344 is negative only when $e_{G1}$ output of generator 300 applied to anode 402 of silicon controlled rectifier 400 is positive with respect to cathode 401. Since the signal appearing at base 345 reflects the difference between the voltages at anode 402 and cathode 401 of silicon controlled rectifier 400, in the event that such voltage at anode 402 is positive with respect to the voltage on cathode 401, then transistor 344 is rendered conductive to provide essentially a zero volt output at collector 349. In the event that the voltage at anode 402 is negative with respect to cathode 401, then transistor 344 is rendered nonconductive and the output at collector 349 is positive. Accordingly, transistor 344 provides a reverse polarity inhibit feature, such arrangement permitting the gating pulse for silicon controlled rectifier 400 to occur only when the voltage applied to anode 402 is positive. The signal produced at collector 349 of transistor 344 is analogous to the signal $\bar{r}$ produced in the modulator of FIG. 5.

It is seen that in the event the voltage at anode 402 of silicon controlled rectifier 400 is not positive whereby transistor 344 is nonconductive and transistor 350 is consequently heavily conductive, collector 354 of transistor 350 short circuits to ground the output appearing at collector 337 of transistor 332 so that no positive signals can be produced.

Capacitor 364 is included to provide short duration pulses which are produced at the beginning of each pulse period of the signal. Transistor 366 and windings 376, 379 and 381 provide a blocking oscillator, such blocking oscillator operation being provided by the feedback winding 376. Diode 384 is included for transient suppression so that an inductance surge will not cause the voltage at collector 380 to exceed breakdown. It is appreciated that in the event that the output of collector 380 is near zero voltage, then a positive pulse appears at the polarity dot terminal of winding 381 to gate silicon controlled rectifier 400 into conductivity.

The voltage applied from negative source 358 to base 352 through resistor 360 maintains transistor 350 in the nonconductive state when no signal (positive) is present at base 352 of transistor 350. This permits collector 337 of transistor 332 to go positive when the summing point voltage at base 334 goes negative, thus actuating blocking oscillator transistor 366 to provide output gating pulses. It is realized that the signal on base 334 of transistor 332 and the signal on base 352 of transistor 350 must both be negative to allow the two collectors 337 and 354 (connected together) to go positive and trigger the blocking oscillator. The bias resistor 360 assures that transistor 350 is nonconductive except when either of the aforesaid inputs is positive (NOR circuit).

In FIG. 22a, there is shown the composite wave shape of the currents at summing point 312 comprising the A.C. bias current ($-I_{AC}$) superimposed on the reference oscillator current ($-I_f$) and a feedback current proportional to the system output voltage.

The restraining circuit output signal when positive also functions to render transistor 350 conductive whereby the blocking oscillator does not produce output gating pulses. It will be further explained below that a restraining circuit output signal reflects a condition wherein current is still flowing in the negative controlled rectifiers whereby commutation to the positive controlled rectifiers is prevented by such restraining circuit output signal.

In FIG. 22b there is shown the signal observed at collector 337 of transistor 332 when the collector circuit of transistor 350 is opened. FIG. 22c shows the signal appearing at collector 337 of transistor 322 when transistor 350 is connected into the circuit. At first glance, it would appear that the wave shape FIG. 22c should follow the dotted line with the pulse remaining until the controlled rectifier polarity is reversed. However, as soon as silicon controlled rectifier 400 is switched into conductivity, the voltage across it abruptly drops down to a very small figure such as about one volt. The design of the circuit comprising transistor 344 and its associated components is such that with so small a voltage appearing at anode 402 of silicon controlled rectifier 400, transistor 344 is not rendered conductive and a reverse polarity inhibit signal is produced which causes the wave shape at the output at collector 337 to rapidly drop to zero as soon as silicon controlled rectifier 400 is rendered conductive. If for any reason silicon controlled rectifier 400 is not rendered conductive when it should have been, then the wave shape of the output at collector 337 follows the dotted line of FIG. 22c.

The waveform of FIG. 22d shows the output of the blocking oscillator with its short duration pulse and the waveform of FIG. 22e shows the generator signal $e_{G1}$ ($e_{G2}$ and $e_{G3}$ have the same wave shape), the hatched portions therein indicating when silicon controlled rectifier 400 conducts. It is to be noted that the positive controlled silicon controlled rectifier is essentially being switched into conductivity during the negative half cycle from the reference oscillator output.

The portion of the modulator for providing the gating signals for silicon controlled rectifier 404 which is in back to back relation with silicon controlled rectifier 400, i.e., it is controlled by the negative half cycles of the $e_{G1}$ output, is the same as that portion for providing the gating signals for silicon controlled rectifier 400, the polarity of the secondary windings of transformers 310, 320A and 322 insuring that the same operation occurs therein. From the waveform of FIG. 22a, it is accordingly seen that a negative controlled silicon controlled rectifier is fired during the positive half cycle of the reference oscillator output.

If the portion of the modulator for providing the firing signals for silicon controlled rectifiers 400 and 404 is considered as a separate unit, then a like pair of units is provided for providing the firing signals for the back to back pair of silicon controlled rectifiers 406 and 408 associated with the generator $e_{G2}$ output and a like pair of units is provided for producing the firing signals for the back to back pair of silicon controlled rectifiers 410 and 412 which are associated with the generator $e_{G3}$ output.

Also, the cosine wave derived from the $e_{G2}$ output is provided from a transformer 308 having a primary winding 305 connected between the $e_{G3}$ and $e_{G1}$ generator output lines, and the cosine wave derived from the $e_{G3}$ output is provided from a transformer 306 wherein the primary winding 301 is connected between the $e_{G2}$ output and the $e_{G1}$ output lines. The upper terminals of the secondary windings 307 and 303 of transformers 308 and 306 are utilized to provide the cosine timing waves for firing positive controlled rectifiers 406 and 410 respectively. The signals appearing at the lower terminals of secondary windings 307 and 303 are utilized as the cosine timing waves for negative controlled silicon controlled rectifiers 408 and 412 respectively.

Likewise, the signal at the lower terminal of the secondary winding of transformer 320A is utilized to provide the reference voltage for silicon controlled rectifiers 406 and 410 and the signal appearing at the upper terminal of the secondary winding of transformer 320A is utilized to provide the reference voltage for silicon controlled rectifiers 408 and 412.

Feedback signals appearing at the lower terminal of winding 322 are utilized to provide the analog feedback for silicon controlled rectifiers 406 and 410 and the signals appearing at the upper terminal of feedback winding 322 are utilized for silicon controlled rectifiers 408 and 412.

The cathode voltages of the positive bank of silicon controlled rectifiers are respectively applied to the positive controlled silicon controlled rectifier modulator portions through center tapped autotransformer 348 to reverse polarity and the cathode voltages of the negative bank of silicon controlled rectifiers are applied to the modulator portions for negative controlled silicon controlled rectifiers 404, 408, and 412 through center tapped windings 414, 416 and 418, respectively to reverse polarity.

The cathodes of the positive controlled silicon controlled rectifiers 400, 406 and 410 are connected to one terminal of an inductor 420 and the anodes of negative controlled rectifiers 404, 408 and 412 are connected to the other terminal of inductor 420, inductor 420 serving to combine the outputs of the silicon controlled rectifiers and to filter out substantially most of the harmonics therein.

The output from inductor 420 is filtered across the parallel combination of an inductor 422 and a capacitor 424. The value of the inductance of inductor 422 is selected to minimize the load current drawn from the system under the worst load and power factor condition. The other parallel combinations, viz., inductor 426 and capacitor 428 and inductor 430 and capacitor 432 respectively are utilized to filter the other combined systems outputs, viz., the phase B output produced by a modulator 450 and a frequency conversion stage 452 comprising silicon controlled rectifiers in circuit with the outputs of generator 300 and the phase C output produced by a modulator 454 and frequency conversion stage 456 comprising silicon controlled rectifiers in circuit with the outputs of generator 300.

A system phase output, such as the phase A output, also appears in current transformer 460, current transformer 460 being utilized to provide the restraining signal, for example, which is applied to base 352 of transistor 350 through resistor 362. The secondary winding 461 of current transformer 460 is center tapped to ground and the upper and lower terminals of secondary winding 461 are connected to bases 472 and 482 of transistors 470 and 480 through resistors 464 and 466, respectively. In transistor 470, base 472 is connected to a positive potential source 500, through a resistor 476, the collector 474 is connected to positive potential source 500, through a resistor 478 and the emitter 479 is connected directly to ground. In transistor 480, similarly, base 482 is connected through a resistor 484 to positive potential source 500, the collector 486 is connected to source 500 through a resistor 488 and the emitter is connected to ground.

The output at collector 486 is applied to those portions of the modulator which are concerned with supplying current restraining signals for the positive controlled silicon controlled rectifiers and the output appearing at collector 474 is applied to those portions of the modulator concerned with providing of current restraining signals for the negative controlled silicon controlled rectifiers.

In the operation of restraining circuit 398, i.e., current transformer 460 and transistors 470 and 480 and their associated circuit components, transistors 470 and 480 are so biased for operation whereby in the quiescent state, they are slightly positive biased so that the transistors are conducting and the output voltage is substantially zero voltage. Thus, when the current signal from the current transformer crosses the zero point and starts to go negative it overcomes the slight bias and renders the transistors nonconductive.

Let it be assumed that a negative signal appears at the lower terminal of secondary winding 461 of current transformer 460. In this situation transistor 480 is rendered nonconductive whereby the positive output at collector 486 applied to base 352 of transistor 350 through resistor 362 prevents any gating pulse output from transistor 332 from switching into conductivity silicon controlled rectifier 400 and positive controlled silicon controlled rectifiers 406 and 410 are also similarly restrained.

Similarly, if a negative signal appears at the upper terminal of secondary winding 461 of current transformer 460, transistor 470 is rendered nonconductive and the positive output appearing at collector 474 is applied as a restraining signal to the modulator portions for the negative controlled silicon controlled rectifiers 404, 408 and 412 to prevent their being switched into conductivity. A negative signal appearing at the upper terminal of the secondary winding 461 of current transformer 460 indicates that current is still flowing in one or more of the positive controlled silicon controlled rectifiers 400, 406 and 410. The output at collector 474, accordingly, prevents commutation to the negative silicon controlled rectifiers 404, 408 and 412 until the current in transformer 460 passes through the zero point, i.e., when the output of collector 474 is zero. When a negative signal appears in lower terminal of secondary winding 461 of transformer 460, this signifies that current is still flowing in one or more of the negative controlled silicon controlled rectifiers 404, 408 and 412 and, similarly, commutation does not occur to the positive silicon controlled rectifiers until the current attains the zero crossover point.

In FIG. 23 there is depicted a logical diagram which corresponds to the modulator shown in FIGS. 13–17. It is seen that the summing of the generator output signal, the reference oscillator output signal, the D.C. bias signal and the feedback signal produces the signal M, the summing of the silicon controlled rectifier anode and cathode voltages produces a signal $P_R$ (or $\bar{r}$) and the current in the output provides the restraining signal $I_R$. The $P_R$ and the $I_R$ inhibit signals are applied to a NOR circuit, the output therefrom being $\overline{P_R I_R}$. The AND function to provide the signal $M\overline{P_R I_R}$ is not a separate circuit structure but resistor 338, for example, in FIGS. 13–17, which is the common load resistor for collectors 337 and 354 of transistors 332 and 350, respectively.

With regard to the output filter, the tuned filter as shown therein is a very satisfactory means for providing a faithful sinusoidal output. However, a tuned circuit is not strictly necessary since the size of the capacitor therein has to be determined at maximum load and for adequate filtering. At such maximum load level, the "Q" of the circuit is very low and the circuit is detuned by the load. At light loads, it becomes unnecessary to have a tuned parallel filter since the capacitor is large enough to provide excellent filtering without the inductive member of the parallel combination.

The system of this invention, namely, a system for providing a plurality of balanced phased outputs having a range of determinable frequencies from a generator having such plurality of balanced phase outputs, the system output having a frequency which is less than the lowest frequency of the generator outputs, may be paralleled with like polyphase output systems. In the event that paralleling is made between like systems of this invention, there would be included therein real and reactive load division circuits such as are well known in the art. The reactive load division circuits are utilized to sense the reactive component of current and the signal produced therefrom is utilized to increase the output voltage of one of the systems in the parallel arrangement depending upon whether such system is carrying less than or more than its share of the reactive load.

The real load division signal is essentially used to increase or decrease the frequency of the system being controlled depending upon whether such system is carrying less than or more than its share of the real load. Actually, the parallel arrangements of systems have to remain at the same frequency as long as they are in synchronism. The real load division signal is utilized to increase or decrease the frequency of the output from the reference oscillator.

It is well known in the art to have protective circuits for sensing over and undervoltages, over and under-frequencies and differential faults. It is contemplated in accordance with this invention to utilize circuits for providing protective functions in conjunction with the system of the invention.

While there have been shown particular embodiments of this invention, it will, of course, be understood that it is not wished to be limited thereto since different modifications may be made both in the circuit arrangements and in the instrumentalities employed and it is contemplated in the appended claims to cover any such modifications as fall within the true spirit and scope of the invention.

What is claimed as new and desired to be secured by Letters Patent of the United States is:

1. In combination, first variable frequency means for producing a plurality of like outputs equally displaced in phase with respect to each other, a source of reference voltage having a determinate range of frequencies, the highest of said reference voltage frequencies being appreciably less than the lowest frequency of said variable frequency, second means in circuit with said source and said first means for mixing said outputs and said reference voltage, third means in circuit with said first means to produce first signal conditions in response to the half cycles of one polarity of said outputs and second signal conditions in response to half cycles of the opposite polarity of said outputs, fourth means in circuit with said second and third means for modulating the output of said third means with the output of said second means, filter means, and means for applying the output of said fourth means to said filter means, the output of said filter means having the frequency of said reference voltage.

2. In combination, first variable frequency means for producing a chosen plurality of like sinusoidal outputs equally displaced in phase with respect to each other, second means in circuit with said first means for converting said sinusoidal outputs to cosinusoidal outputs, a source of reference voltage having a substantially constant frequency which is appreciably less than the lowest frequency of said variable frequency, said source having an amount of balanced phase outputs equal to said chosen plurality, said chosen plurality of third means, each of said third means being in circuit with the outputs of said second means and a discrete output of said reference voltage source for mixing the outputs of said first means with said discrete output, said chosen plurality of fourth means, each in circuit with said first means to produce said plurality of first signal conditions in response to half cycles of one polarity of said outputs and to produce said plurality of second signal conditions in response to half cycles of the opposite polarity of said outputs, said chosen plurality of fifth means in circuit with said third and fourth means respectively, for modulating the outputs of said fourth means with the outputs of said third means, said plurality of combining means, and means for applying the output of said fifth means to said combining means, the respective outputs of said combining means having the frequency of said reference voltage.

3. In combination, first variable frequency means for producing a plurality of like sinusoidal outputs equally displaced in phase with respect to each other, second means in circuit with said first means for converting said sinusoidal outputs to cosinusoidal outputs, third means in circuit with said first means for producing signal conditions respectively representative of the voltage across a switching device during its conductive state and its nonconductive state, a source of reference voltage having a substantially constant frequency which is appreciably less than the lowest value of said variable frequency, fourth means in circuit with said second and third means and said reference voltage source for modulating said reference voltage with the output of said third means for producing said signals during the signal conditions representative of said conductive state, filter means, means for applying the output of said fourth means to said filter means, the output of said filter means having the frequency of said reference voltage.

4. In combination, first variable frequency means for producing a chosen plurality of like balanced phase sinusoidal outputs, second means in circuit with said first means for converting said sinusoidal outputs to cosinusoidal outputs, a source of reference voltage having a substantially constant frequency which is appreciably less than the lowest value of said variable frequency, said chosen plurality of third means in circuit with said first means for respectively producing a first signal representative of the voltage across a silicon controlled rectifier during its conductive state, a second signal representative of the voltage across said silicon controlled rectifier during its nonconductive state, and a third signal which is representative of a voltage proportional to the current of an output from said first means, said chosen plurality of fourth means respectively in circuit with said second means, said third means and said reference voltage source for mixing said cosinusoidal outputs with said reference voltage, for modulating the resultants of said mixing with said first signals and for mixing said third signal with said modulated resultants to produce first representative outputs of silicon controlled rectifiers which are conductive during portions of like half cycles of one polarity of one of said outputs of said first means and to produce second representative outputs of second controlled rectifiers which are conductive during portions of half cycles of the opposite polarity of the outputs of said first means, combining means, means for applying said silicon controlled rectifier representative outputs to said combining means, the output of said combining means having the frequency of said reference voltage, said representative outputs occurring during like half cycles respectively of the outputs of said combining means.

5. In combination, first variable frequency means for producing a chosen plurality of like balanced phase sinusoidal outputs, second means in circuit with said first means for converting said sinuosoidal outputs to cosinusoidal outputs, a source of reference voltage having a substantially constant frequency which is appreciably less than the lowest frequency of said variable frequency, said source having an amount of balanced phase outputs equal to said chosen plurality, said chosen plurality of third means, each in circuit with said first means for producing first signal conditions representative of the respective voltages across silicon controlled rectifiers during their conductive states, second signal conditions representative of the respective voltages across silicon controlled rectifiers during their nonconductive states, and third signal conditions representative of voltages which are proportional to the currents of said outputs, said chosen plurality of fourth means, each of said fourth means being in circuit with said second means, a corresponding one of said third means, and a corresponding one of the outputs of said reference voltage source for mixing the outputs of said second means with a reference voltage output, for modulating the resultant of said mixing with said first signals and for applying said third signals to said modulated resultant, to produce representative outputs of said plurality of first silicon controlled rectifiers which are conductive during portions of half cycles of like polarity of the outputs of said first means and representative outputs of said plurality of second silicon controlled rectifiers which are conductive during portions of the half cycles of the opposite polarity of the outputs of said first means, said chosen plurality of combining means, and means for applying the respective outputs of each of said fourth means to a combining means, the respective outputs of said combining means having the frequency of said reference voltage source.

6. In the combination defined in claim 5 and further including filter means in circuit with the outputs of said combining means for substantially removing therefrom components other than those having the frequency of said reference voltage.

7. In the combination defined in claim 6 and further including means for feeding back the respective outputs of said filter means to said reference voltage source to control the phase displacement of the outputs of said source.

8. In the combination defined in claim 5 and further including a unidirectional potential source and means for applying potential from said last named source to said modulated resultants to produce a voltage threshold level thereon, said representative outputs only being produced at voltages exceeding said level.

9. In the combination defined in claim 8 wherein each of said fourth means comprises said chosen plurality of means for mixing an output of said second means with an output from said reference voltage source, sensing means responsive to the application thereto of the resultant of said mixing, a signal resulting from the addition of said first and second signal and said third signal to provide a fourth signal during half cycles of one polarity of said output of said first means, and means responsive to the coincident application thereto of said third signal and said fourth signal for producing said representative output.

10. In the combination defined in claim 9 wherein said sensing means includes a NAND circuit.

11. In the combination defined in claim 10 wherein said sensing means further includes means in circuit with said mixing means and said NAND circuit for providing an output only during said half cycles of said one polarity.

References Cited in the file of this patent

UNITED STATES PATENTS

| | | |
|---|---|---|
| 2,721,302 | Bivens et al. | Oct. 18, 1955 |
| 2,995,696 | Stratton et al. | Aug. 8, 196' |